US012645349B2

(12) United States Patent
Fuchikami

(10) Patent No.: US 12,645,349 B2
(45) Date of Patent: Jun. 2, 2026

(54) OPERATING SYSTEM, PROCESSING SYSTEM, COMPUTER, OPERATING METHOD, AND STORAGE MEDIUM FOR ALLOWING REMOTE OPERATION OF A SEPARATE DEVICE

(71) Applicant: KABUSHIKI KAISHA TOSHIBA, Tokyo (JP)

(72) Inventor: Yasunori Fuchikami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 152 days.

(21) Appl. No.: 18/395,856

(22) Filed: Dec. 26, 2023

(65) Prior Publication Data

US 2024/0126416 A1     Apr. 18, 2024

Related U.S. Application Data

(63) Continuation of application No. PCT/JP2022/025277, filed on Jun. 24, 2022.

(30) Foreign Application Priority Data

Jun. 28, 2021     (JP) ................................. 2021-106283

(51) Int. Cl.
*G06F 3/0484* (2022.01)
*G06F 3/0481* (2022.01)
(Continued)

(52) U.S. Cl.
CPC .......... *G06F 3/0484* (2013.01); *G06F 3/0481* (2013.01); *G06F 3/1454* (2013.01); *G06F 9/451* (2018.02)

(58) Field of Classification Search
CPC .... G06F 3/0484; G06F 3/0481; G06F 3/1454; G06F 9/452; G06F 9/451; G06F 2203/0383
See application file for complete search history.

(56) References Cited

U.S. PATENT DOCUMENTS

2006/0103508 A1*  5/2006  Sato ......................... G06F 3/038
                                                      340/286.01
2015/0331559 A1*  11/2015  Antonelli ............ G06F 3/04842
                                                      715/739
(Continued)

FOREIGN PATENT DOCUMENTS

CN          104395843 A     3/2015
CN          107666987 A     2/2018
(Continued)

OTHER PUBLICATIONS

English Machine Translation of WO201319074, obtained from https://patentscope.wipo.int/search/en/detail.jsf?docId= WO2013190714, 2025 (Year: 2025).*
(Continued)

*Primary Examiner* — Nicholas Ulrich
(74) *Attorney, Agent, or Firm* — Oblon, McClelland, Maier & Neustadt, L.L.P.

(57) ABSTRACT
According to one embodiment, an operating system acquires an image signal from a first device that is an operation object. The operating system causes a display device to display a screen based on the image signal. The operating system generates an operation command corresponding to an input operation from a user in response to the input operation. The operating system generates an operation signal compatible with the first device based on the operation command, and transmits the operation signal to the first device.

17 Claims, 18 Drawing Sheets

①MOUSE RIGHT CLICK

POSITION X:○○, POSITION:Y○○

②IMAGE RECOGNITION aaa.bmp

③MOUSE RIGHT CLICK

POSITION X:△△, POSITION:Y△△

④IMAGE RECOGNITION bbb.bmp

⑤MOUSE RIGHT CLICK

POSITION X:●●, POSITION Y:●●

(51) Int. Cl.
    *G06F 3/14*         (2006.01)
    *G06F 9/451*      (2018.01)

(56)           References Cited

U.S. PATENT DOCUMENTS

| | | | |
|---|---|---|---|
| 2017/0001308 A1 | 1/2017 | Bataller et al. | |
| 2018/0046262 A1* | 2/2018 | Ishimoto | G06V 20/20 |
| 2019/0295498 A1* | 9/2019 | Lee | G06F 3/1423 |

FOREIGN PATENT DOCUMENTS

| | | | |
|---|---|---|---|
| JP | 59-140567 A | 8/1984 | |
| JP | 8-237768 A | 9/1996 | |
| JP | 2004-110489 A | 4/2004 | |
| JP | 2004-153731 A | 5/2004 | |
| JP | 2006-172423 A | 6/2006 | |
| JP | 2014-215995 A | 11/2014 | |
| JP | 2015-158867 A | 9/2015 | |
| JP | 2017-224114 A | 12/2017 | |
| JP | 2018-535459 A | 11/2018 | |
| WO | WO 2013/190714 A1 | 12/2013 | |

OTHER PUBLICATIONS

International Search Report issued Sep. 13, 2022 in PCT/JP2022/025277 filed on Jun. 24, 2022, 2 pages.
Japanese Office Action issued Jul. 1, 2025 in Japanese Patent Application No. 2023-531897 (with unedited computer-generated English translation), 12 pages.

* cited by examiner

| RECIPE ID | 121134 |
|---|---|
| LOT ID | 5N3458 |
| PRODUCT TYPE ID | NSCKZ |
| PROCESS ID | AA/IBE |

| RECIPE ID | 121134 |
|---|---|
| LOT ID | 5N3458 |
| PRODUCT TYPE ID | NSCKZ |
| PROCESS ID | AA/IBE |

| RECIPE ID | 121134 |
|---|---|
| LOT ID | 5N3458 |
| PRODUCT TYPE ID | NSCKZ |
| PROCESS ID | AA/IBE |

FIG. 8A

```
Command = 1;
r = DoOperation(command)

Command = 2;
r = DoOperation(command)

If(!r)
  command = 1
```

FIG. 8B

```
①MOUSE RIGHT CLICK
    POSITION X : ○○, POSITION : Y○○
②IMAGE RECOGNITION aaa.bmp
③MOUSE RIGHT CLICK
    POSITION X : △△, POSITION : Y△△
④IMAGE RECOGNITION bbb.bmp
⑤MOUSE RIGHT CLICK
    POSITION X : ●●, POSITION Y : ●●
```

OPERATING SYSTEM, PROCESSING SYSTEM, COMPUTER, OPERATING METHOD, AND STORAGE MEDIUM FOR ALLOWING REMOTE OPERATION OF A SEPARATE DEVICE

CROSS-REFERENCE TO RELATED APPLICATIONS

This is a continuation application of International Patent Application No. PCT/JP2022/025277, filed on Jun. 24, 2022; and also claims priority to Japanese Patent Application No. 2021-106283, filed on Jun. 28, 2021; the entire contents of which are incorporated herein by reference.

FIELD

Embodiments described herein relate generally to an operating system, a processing system, a computer, an operating method, and a storage medium.

BACKGROUND

There is a system in which one device is operated by another device. It is desirable to further improve the convenience of such a system.

BRIEF DESCRIPTION OF THE DRAWINGS

FIG. 8A is a schematic view illustrating a portion of a first file, and FIG. 8B is a schematic view illustrating a portion of a second file;

DETAILED DESCRIPTION

Figure 1:
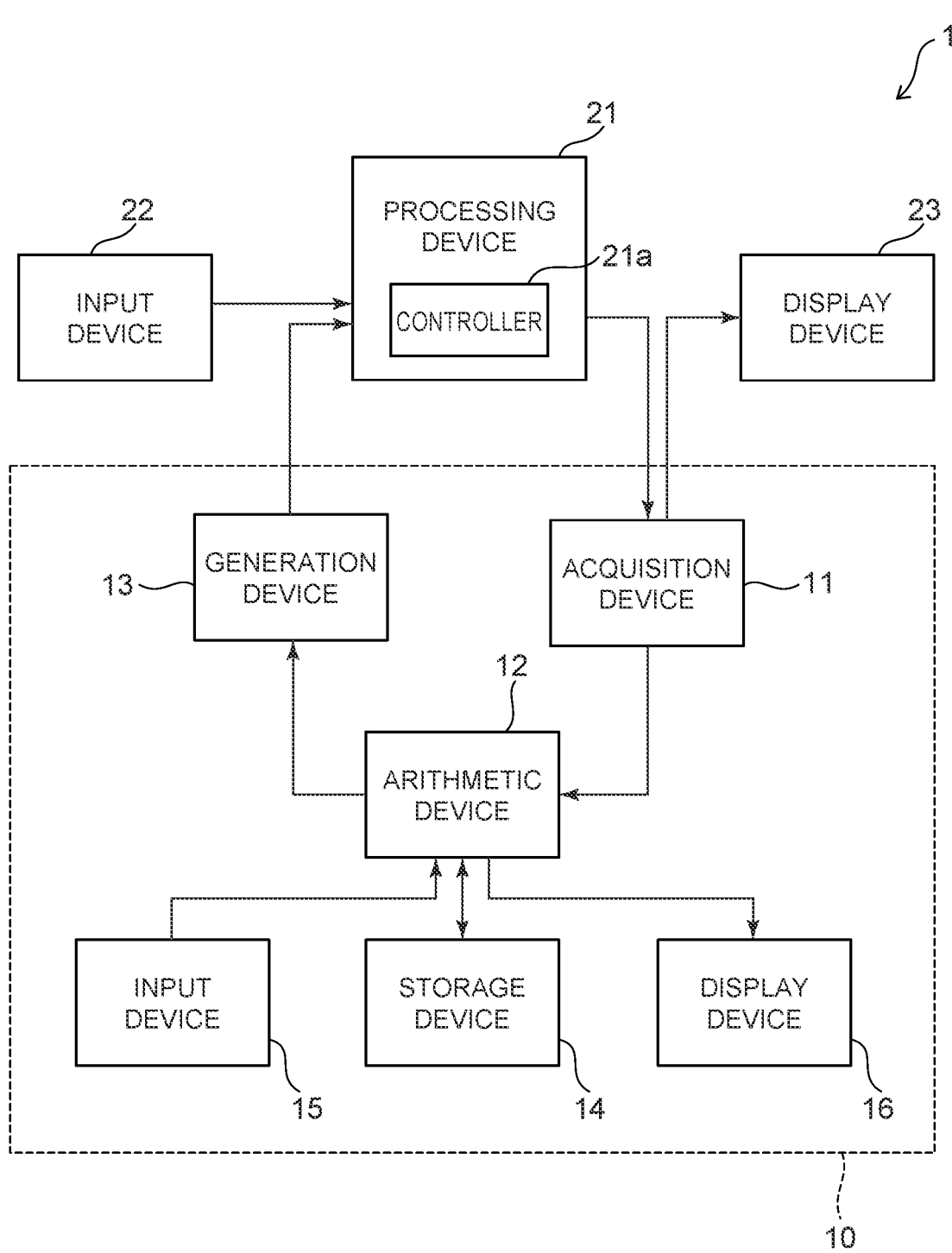
FIG. 1 is a schematic view showing an operating system according to an embodiment.

According to one embodiment, an operating system acquires an image signal from a first device that is an operation object. The operating system causes a display device to display a screen based on the image signal. The operating system generates an operation command corresponding to an input operation from a user in response to the input operation. The operating system generates an operation signal compatible with the first device based on the operation command, and transmits the operation signal to the first device.

Various embodiments will be described hereinafter with reference to the accompanying drawings. In the specification and drawings, components similar to those described or illustrated in a drawing thereinabove are marked with like reference numerals, and a detailed description is omitted as appropriate.

FIG. 1 is a schematic view showing an operating system according to an embodiment.

As shown in FIG. 1, a processing system 1 includes an operating system 10 and a processing device 21 (a first device). The operating system 10 includes an acquisition device 11, an arithmetic device 12, a generation device 13, a storage device 14, an input device 15, and a display device 16. The operating system 10 is used to operate the processing device 21.

The processing device 21 processes a workpiece. The processing is, for example, at least one selected from transferring, patterning, cleaning, heating, cooling, and drying. Patterning is, for example, at least one selected from film formation, etching, polishing, lithography, and bonding.

The processing device 21 includes a controller 21a. The components of the processing device 21 process a workpiece by operating based on commands transmitted from the controller 21a. The controller 21a includes, for example, a central processing unit (CPU), read-only memory (ROM), random access memory (RAM), a storage device, an input interface, an output interface, a communication interface, and a bus connected to these components. The controller 21a may be a special-purpose computer for the processing device 21 or may be a general-purpose computer. The function of the controller 21a may be realized by the collaboration of multiple computers.

An input device 22 is used by the user to input data to the processing device 21. The user is, for example, an operator supervising the processing performed by the processing device 21. The input device 22 includes, for example, at least one selected from a keyboard, a mouse, a touchpad, and a microphone (audio input).

A display device 23 displays the image signal output from the processing device 21 to be visually recognizable by the user. The display device 23 includes a monitor.

The acquisition device 11 acquires an image signal output from the processing device 21 to the display device 23, and transmits the image signal to the display device 23. The acquisition device 11 includes, for example, a capture unit and a divider of the image signal. The acquisition device 11 transmits the acquired image signal to the arithmetic device 12.

The arithmetic device 12 causes the display device 16 to display a screen based on the received image signal. The arithmetic device 12 receives an operation (an input operation) input by the user using the input device 15. In response to the input operation, the arithmetic device 12 generates an operation command corresponding to the input operation. The operation command is a command to perform the same operation content as the input operation. The arithmetic device 12 transmits the operation command to the generation device 13.

The input operation is the movement of a pointer, a selection, an input of characters, etc. For example, the selection operation causes the selection of an icon, the display of a menu, the selection of a menu, the setting of the focus to an input field, etc. The selection of an area, the selection of multiple icons, etc., are performed by combining a selection and a movement of the pointer.

When the selection operation is performed, the arithmetic device 12 performs the transformation of coordinates. Specifically, the arithmetic device 12 performs a coordinate transformation when the content displayed in the screen of the display device 23 is reduced or enlarged according to the resolution of the screen of the display device 16. In the coordinate transformation, the arithmetic device 12 acquires the coordinates selected in the screen of the display device 16. The arithmetic device 12 transforms the coordinates into coordinates of the screen of the display device 23. This is because, generally, different types of display devices have mutually-different resolutions, origin coordinates, coordinate systems, etc.

The arithmetic device 12 includes, for example, a CPU, ROM, RAM, a storage device, an input interface, an output interface, a communication interface, and a bus connecting these components. The arithmetic device 12 is a special-purpose or general-purpose computer. The function of the arithmetic device 12 may be realized by the collaboration of multiple computers. The input device 15 includes, for example, at least one selected from a keyboard, a mouse, a touchpad, and a microphone. The display device 16 includes a monitor.

Based on the operation command, the generation device 13 generates an operation signal compatible with the processing device 21. The generation device 13 inputs the generated operation signal to the processing device 21 (the controller 21a) which is the operation object. For example, when the input device 22 includes a mouse or a keyboard, the operation signal corresponds to a signal transmitted from the mouse or keyboard to the controller 21a. When the input device 22 includes a touchpad, the operation signal corresponds to a signal transmitted from the touchpad to the controller 21a. The generation device 13 includes, for example, a microcomputer programmed to generate an operation signal corresponding to the signal transmitted from the input device 22.

Upon receiving the operation signal, the processing device 21 moves a pointer, selects an icon, inputs characters, etc., according to the operation signal.

The storage device 14 stores various data necessary for the operation of the processing device 21. For example, the storage device 14 stores the resolutions, origin coordinates, coordinate systems, etc., of the display devices 16 and 23. The storage device 14 includes a hard disk drive (HDD), a solid-state drive (SSD), a network-attached hard disk (NAS), etc.

FIGS. 2A, 2B, 3A, and 3B are schematic views illustrating screens of display devices.

Figure 2A:
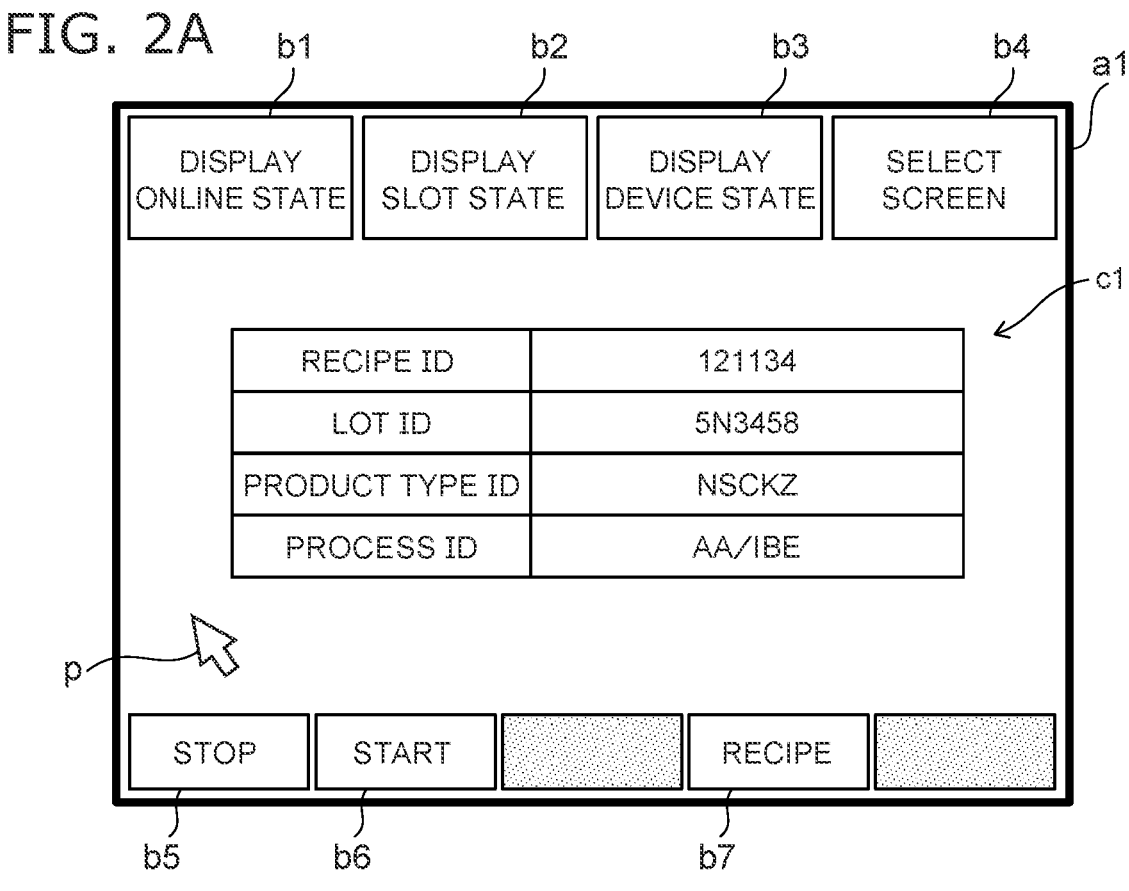
FIGS. 2A and 2B are schematic views illustrating screens of display devices.
Figure 2B:
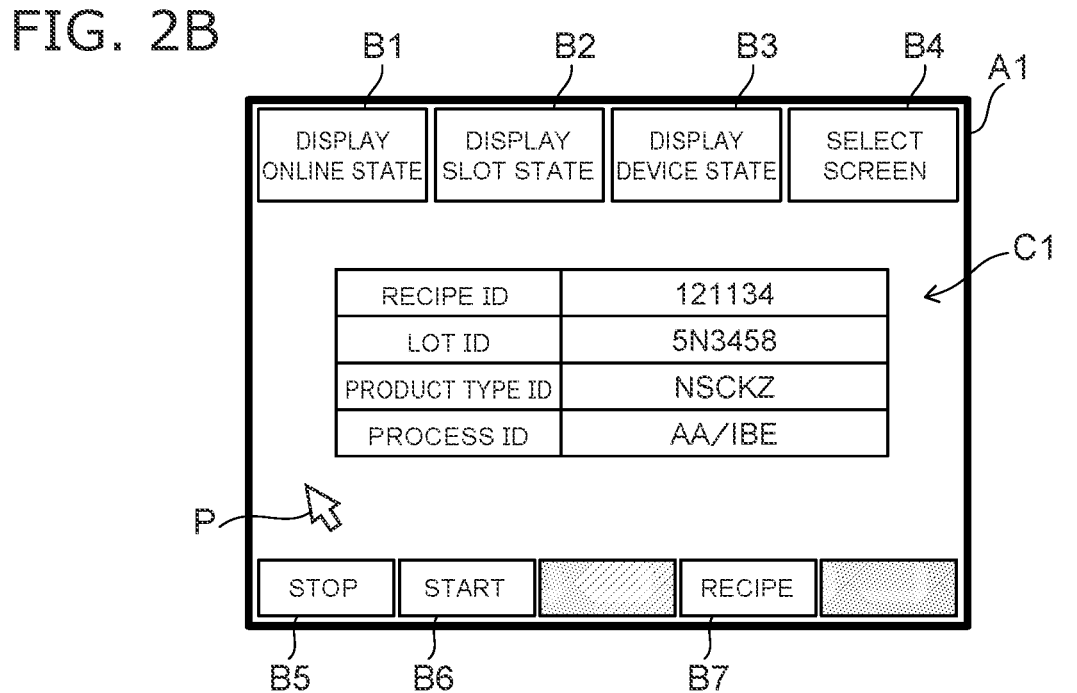
Figure 3A:
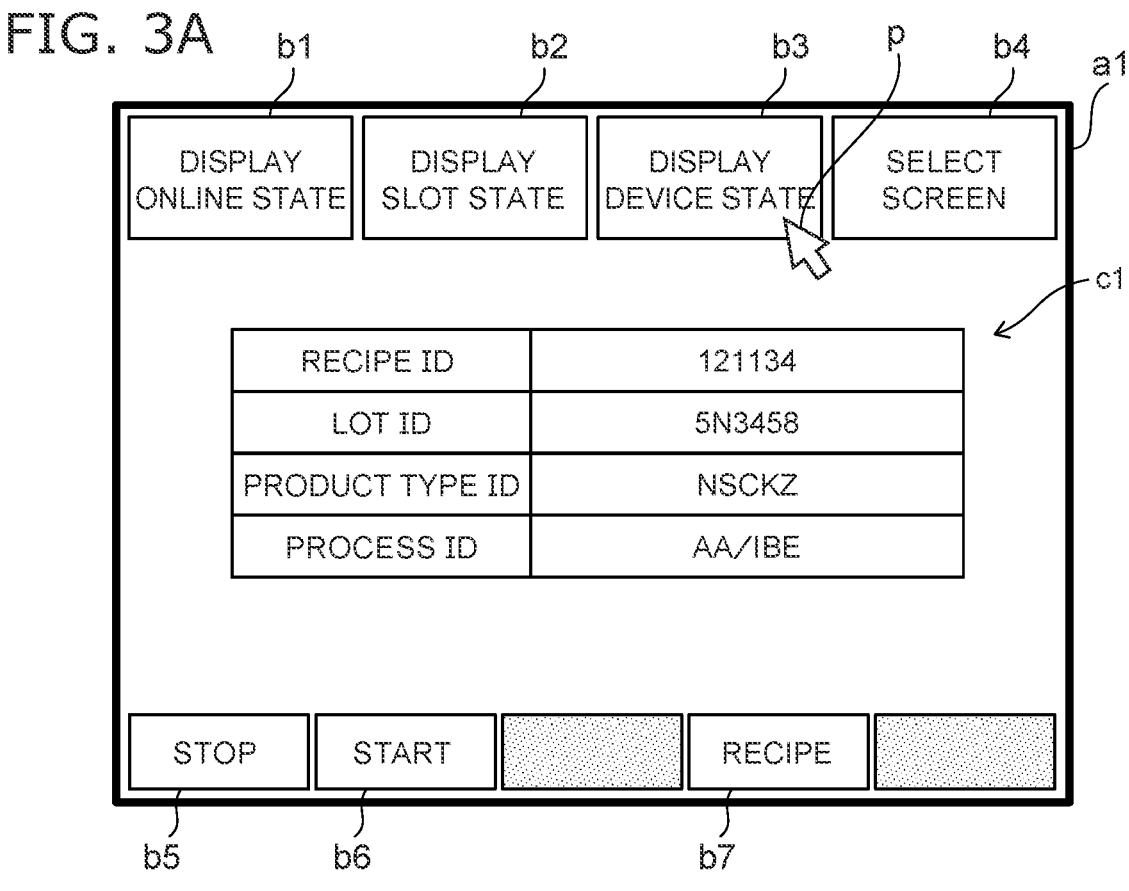
FIGS. 3A and 3B are schematic views illustrating screens of the display devices.
Figure 3B:
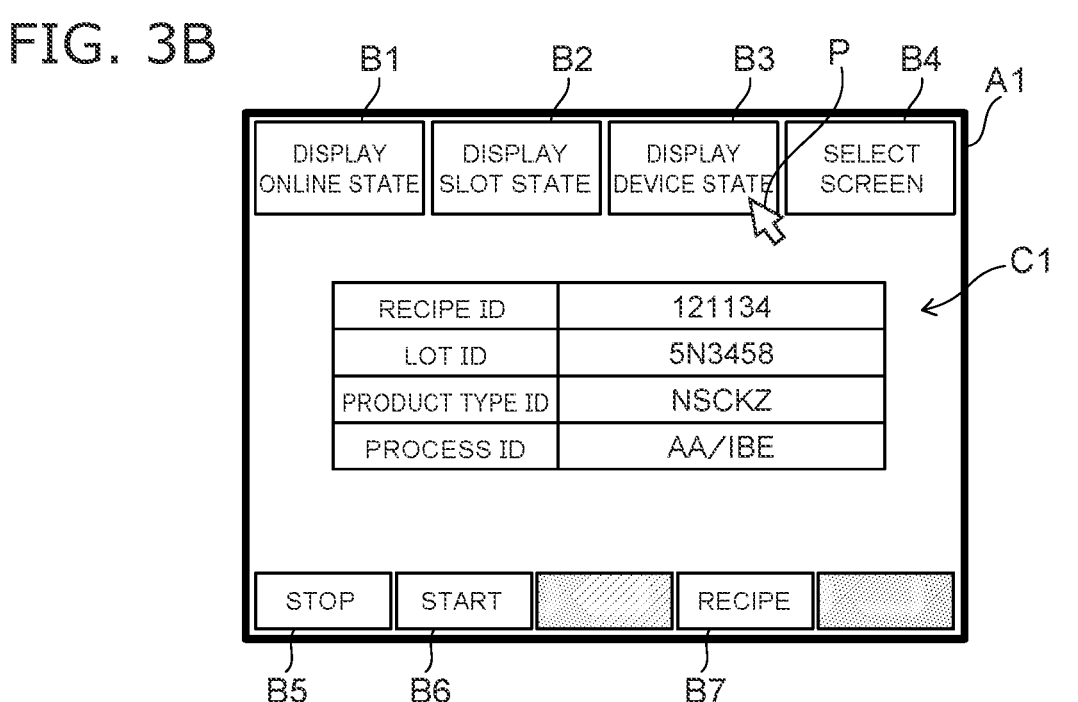

FIGS. 2A and 3A are examples of the screen displayed by the display device 23. FIGS. 2B and 3B are examples of the screen displayed by the display device 16. In the example, the resolution of the screen of the display device 23 is greater than the resolution of the screen of the display device

16. The entire screen of the display device 23 is displayed in the screen of the display device 16 by being reduced. When the resolution of the screen of the display device 23 is less than the resolution of the screen of the display device 16, the entire screen of the display device 23 is displayed in the screen of the display device 16 with the same size as the screen of the display device 23. The content displayed by the screen of the display device 23 may be enlarged according to the resolution of the screen of the display device 16.

The screen that is displayed by the display device 16 and the screen that is displayed by the display device 23 are based on the same image signal. Therefore, as shown in FIGS. 2A and 2B, the same content as a screen al of the display device 23 is displayed in a screen A1 of the display device 16. In the illustrated example, the screen al displays icons b1 to b7 and information cl related to the workpiece being processed by the processing device 21. The screen A1 displays icons B1 to B7, which are the same as the icons b1 to b7, and information C1, which is the same as the information cl.

The user uses the input device 15 while viewing the screen A1 of the display device 16 to input operations to the arithmetic device 12. For example, as shown in FIGS. 2B and 3B, the user moves a pointer P to the icon B3 on the screen A1 and selects the icon B3 by clicking. In such a case, the arithmetic device 12 acquires the clicked coordinates. The arithmetic device 12 accesses the storage device 14 and refers to the origin coordinates of the display device 16, the coordinate system of the display device 16, the origin coordinates of the display device 23, and the coordinate system of the display device 23.

Figure 4A:
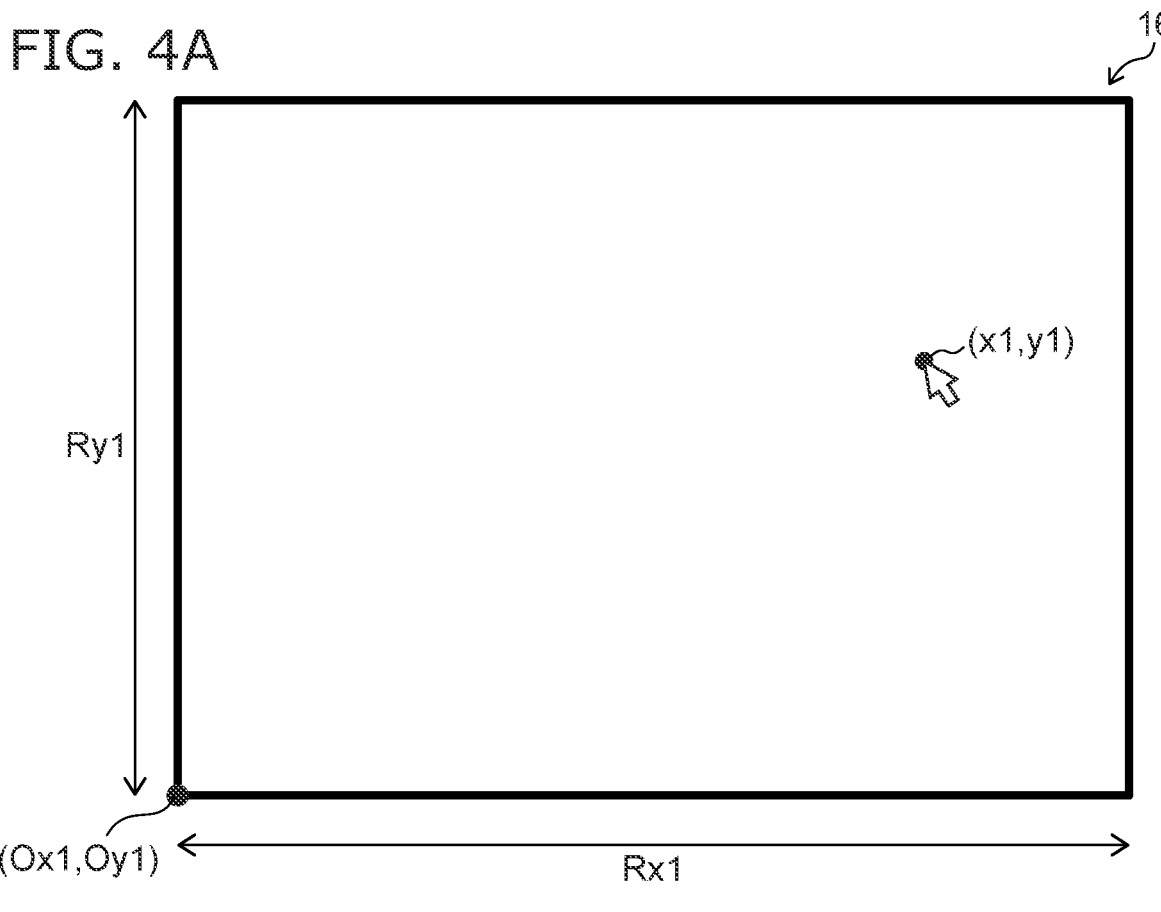
FIGS. 4A and 4B are schematic views for describing a coordinate transformation of the operating system according to the embodiment.
Figure 4B:
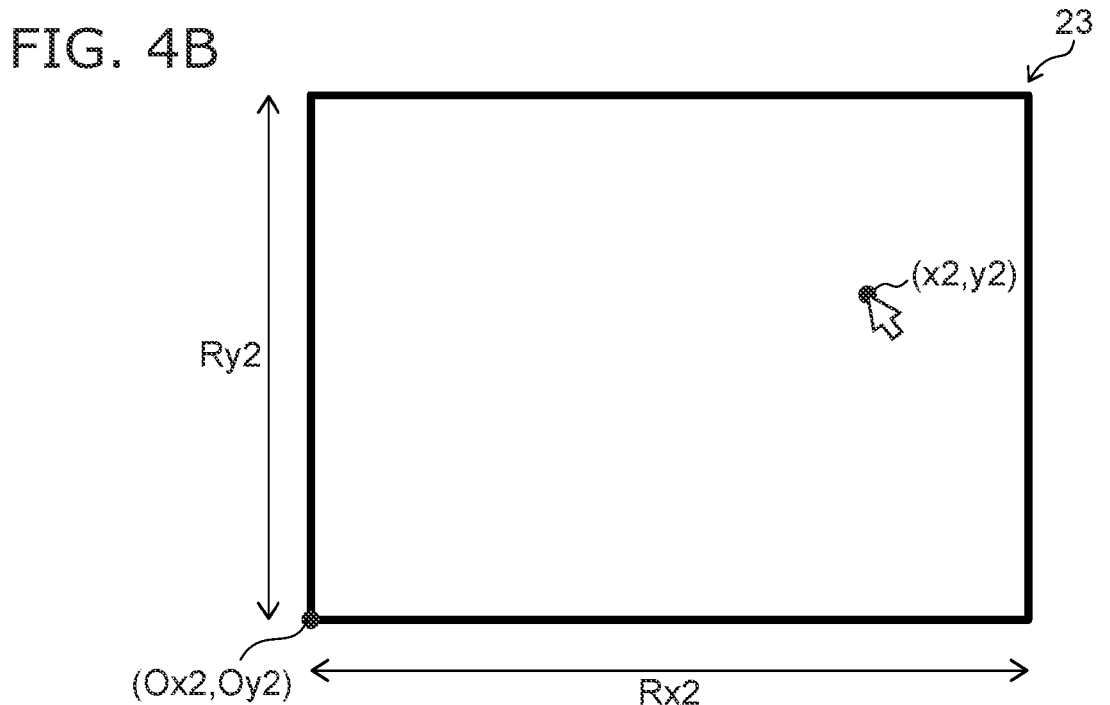

FIGS. 4A and 4B are schematic views for describing the coordinate transformation of the operating system according to the embodiment.

As shown in FIGS. 4A and 4B, the resolution in the X-direction of the display device 16 is taken as Rx1; the X-coordinate of the origin in the coordinate system of the display device 16 is taken as Ox1; the resolution in the X-direction of the display device 23 is taken as Rx2; and the X-coordinate of the origin in the coordinate system of the display device 23 is taken as Ox2. The arithmetic device 12 can use the following formula to transform an X-direction coordinate x1 of a point clicked on the screen of the display device 16 into an X-direction coordinate x2 of a point clicked on the screen of the display device 23.

$$x2=(x1-Ox1)\times(Rx2-Ox2)/(Rx1-Ox1)+Ox2$$

The resolution in the Y-direction of the display device 16 is taken as Ry1; the Y-coordinate of the origin in the coordinate system of the display device 16 is taken as Oy1; the resolution in the Y-direction of the display device 23 is taken as Ry2; and the Y-coordinate of the origin in the coordinate system of the display device 23 is taken as Oy2. The arithmetic device 12 can use the following formula to transform a Y-direction coordinate y1 of a point clicked on the screen of the display device 16 into a Y-direction coordinate y2 of a point clicked on the screen of the display device 23.

$$y2=(y1-Oy1)\times(Ry2-Oy2)/(Ry1-Oy1)+Oy2$$

The arithmetic device 12 generates an operation command to move the pointer to the transformed coordinates (x, y)=(x2, y2) and an operation command to select the coordinates (x, y)=(x2, y2). The generation device 13 generates operation signals compatible with the processing device 21 based on the operation commands.

According to the operation signal as shown in FIG. 3B, the processing device 21 moves the pointer p to the icon b3 and selects the icon b3. By including the transformed coordinates in the operation commands, the operating system 10 can appropriately operate the processing device 21 regardless of the difference between the specifications of the display device 16 and the specifications of the display device 23.

As an example, the resolution of the display device 16 is 2000×1000. The origin coordinates in the coordinate system of the display device 16 are (x, y)=(10, 20). The resolution of the display device 23 is 640×480. The origin coordinates in the coordinate system of the display device 23 are (x, y)=(0, 0). A point with the coordinates (x, y)=(460, 400) on the screen al of the display device 16 is clicked. The arithmetic device 12 uses the formula above to transform the clicked coordinates of the screen A1 into the clicked coordinates of the screen al as follows.

$$x2=460\times(2000-10)/640+10$$

$$y2=400\times(1000-20)/480+20$$

The clicked coordinates (x, y)=(1440, 837) of the screen al are calculated thereby.

Figure 5:
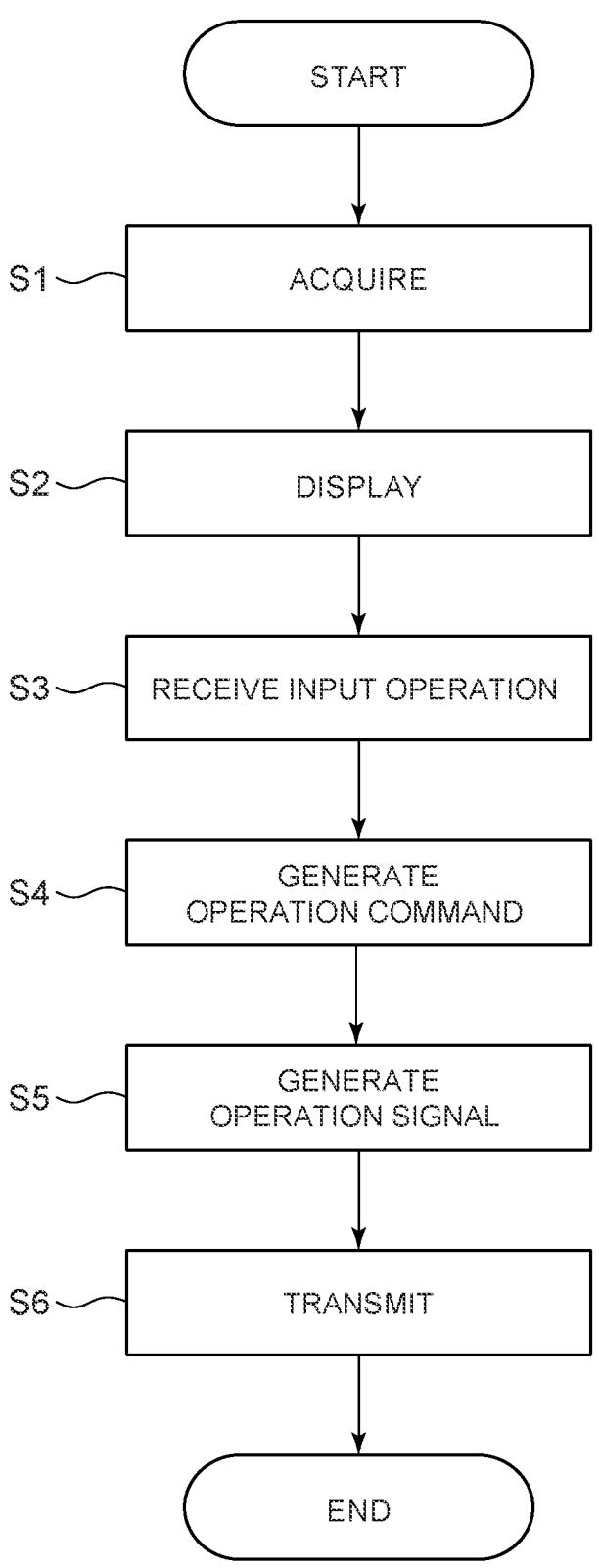
FIG. 5 is a flowchart showing an operation of the operating system according to the embodiment.

FIG. 5 is a flowchart showing an operation of the operating system according to the embodiment.

The acquisition device 11 acquires an image signal (step S1). The arithmetic device 12 causes the display device 16 to display a screen based on the image signal (step S2). The arithmetic device 12 receives an input operation performed using the input device 15 (step S3). Upon receiving the input operation, the arithmetic device 12 generates an operation command corresponding to the input operation (step S4). The generation device 13 generates an operation signal compatible with the processing device 21 based on the operation command (step S5). The generation device 13 transmits the generated operation signal to the processing device 21 (step S6). The processing device 21 operates according to the received operation signal.

Advantages of the embodiment will now be described.

The operating system 10 acquires the image signal from the processing device 21 and transmits, to the processing device 21, an operation signal that is compatible with the processing device 21. The operating system 10 transmits, to the processing device 21, an operation signal that corresponds to the input operation from the user. The user can use the operating system 10 to operate the processing device 21 without using the input device 22. By applying the operating system 10 to an existing processing device 21, an existing input device 22, and an existing display device 23, the processing device 21 can be remotely operated easily without the need for an alteration of the processing device 21, a communication setting for remote operation, furnishment of special communication requirements, etc. According to the operating system 10, the user can use the input device 15 to directly operate the processing device 21 without storing an input operation, performing a stored input operation, etc. According to the embodiment, the convenience of the operating system 10 can be improved.

It is unnecessary for the operating system 10 to access data of the processing device 21, etc., when the operating system operates the processing device 21. According to the embodiment, the processing device 21 can be remotely operated in a state in which the processing device 21 is connected to only a limited network, which can improve the security of the data related to the processing device 21.

Here, "remote operation" means the utilization of electrical signals or the like to operate the processing device 21 by using the operating system 10 that is separate from the processing device 21. It is unnecessary for the operating system 10 to be located at a location separated from the processing device 21. The operating system 10 may be located at a location separated from the processing device 21, or may be located adjacent to the processing device 21.

The screen based on the image signal is reduced or enlarged by the arithmetic device 12 according to the resolution of the display device 16. As a result, the entire screen of the display device 23 can be displayed by the display device 16, and it is easy to perform the operation of selecting an icon, displaying a menu, selecting a menu, setting the focus to an input field, etc. The ease of use of the processing system 1 and the operating system 10 can be improved.

When the screen is enlarged or reduced, misalignment occurs between the coordinates selected in the screen of the display device 16 and the coordinates to be selected in the screen of the display device 23. The arithmetic device 12 performs the coordinate transformation described above to correct the misalignment. As a result, the appropriate position in the screen of the display device 23 can be selected even when the screen is enlarged or reduced.

First Modification

Figure 6:
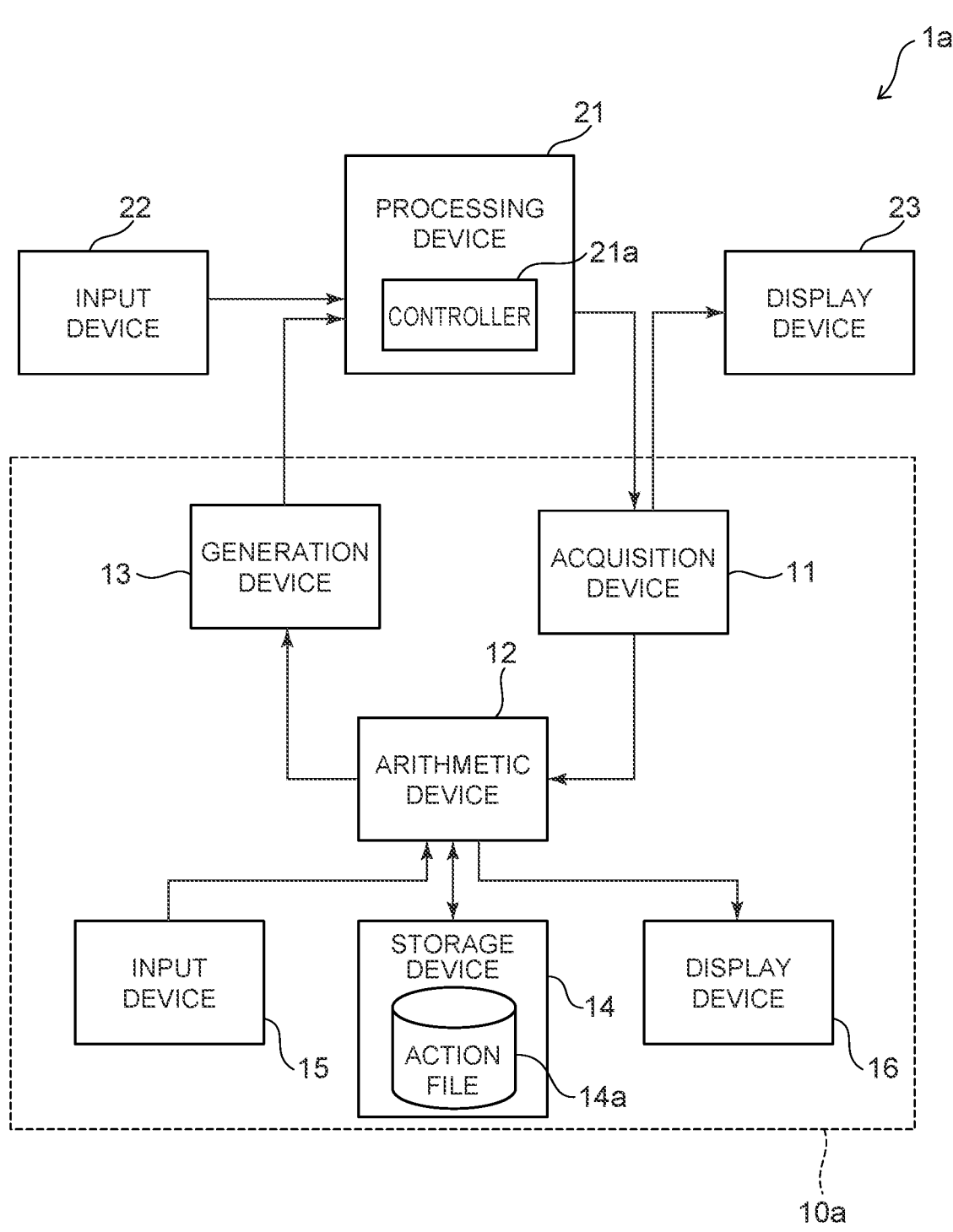
FIG. 6 is a schematic view showing an operating system according to a first modification of the embodiment.

FIG. 6 is a schematic view showing an operating system 10a according to a first modification of the embodiment.

The operating system 10a according to the first modification is configured to perform an automatic operation mode for automatically operating the processing device 21. A processing system 1a includes the operating system 10a and the processing device 21. The storage device 14 stores an action file 14a referred to in the automatic operation mode. Operations for the processing device 21 are written in the action file 14a.

The user uses the input device 15 or 22 to operate the processing device 21. When an operation signal from the generation device 13 or an input operation from the input device 22 is input to the processing device 21, the processing device 21 is operated; and the screen of the display device 23 changes. Based on the input from the input device 15 and the change of the screen, the arithmetic device 12 determines that the operation was performed and writes in the action file. In the automatic operation mode, the arithmetic device 12 generates an operation command based on the action file. As a result, the operation that is performed by the user is automatically repeated by the operating system 10a.

The action file includes a first file and a second file. A generation action for generating an operation command is written in the first file. For example, the first file is a program file in which an action sequence for generating the operation command and transmitting the operation command to the generation device 13 is written. The first file is written in a general-purpose programming language such as C, etc.

The second file is referred to when performing the generation action. The second file includes information used to identify an output signal and generate an operation signal described below. For example, coordinates selected by a pointing device, information of data referred to in the image recognition, etc., are written in a text format to the second file.

The arithmetic device 12 performs the generation action written in the first file while referring to the information included in the second file. The arithmetic device 12 performs image recognition processing of the screen based on the acquired image information. A change of the screen, a performed operation, etc., are determined using the image recognition. In the image recognition, at least one selected from template matching, character recognition, and color recognition is performed. The reference data that is necessary for the action file and the image recognition is prepared beforehand by the user or the operating system 10a.

For a pointing device such as a mouse or the like, the arithmetic device 12 writes the selected coordinates in the second file and stores the second file in the storage device 14. For example, the user uses the input device 15 to click while viewing the screen of the display device 16. The arithmetic device 12 transforms the clicked coordinates into coordinates of the screen of the display device 23 and writes the coordinates in the second file.

For a keyboard, the acquisition device 11 acquires the image signal from the processing device 21 to the display device 23 when characters are input by the keyboard. Based on the image signal, the arithmetic device 12 causes the display device 16 to display a screen. The user aligns the pointer with a text box for inputting characters on the displayed screen and selects the coordinates. The focus is thereby set to the text box. The user uses the input device 15 to input characters to the text box. The arithmetic device 12 writes, in the second file, the coordinates of the screen of the display device 23 and one or more characters input to the text box.

After the operation signal is transmitted to the processing device 21, the arithmetic device 12 uses image recognition to determine whether or not the processing device 21 has been operated according to the operation signal. When an operation is determined not to be performed, the arithmetic device 12 may transmit a notification, to the display device 16 or another terminal device, that the operation is not possible. The filename of the template image used in the image recognition, the area used in the character recognition, the image and area used in the color recognition, etc., are written in the second file.

To prepare the template image, the acquisition device 11 acquires the image signal from the processing device 21 to the display device 23 when performing the image recognition. The arithmetic device 12 causes the display device 16 to display a screen based on the image signal. The user uses the input device 15 to select a portion of the displayed screen. The selected portion is stored in the storage device 14 as a template image. The user writes, in the second file, the filename of the template image to be referred to. For example, template images are prepared for all of the screens for which automatic operations by the operating system 10a are to be performed. The screen changes when the processing device 21 is operated. For example, the displayed screen transitions to another screen, or a window is displayed. A partial image that is included in the screen after the change but is not included in the screen before the change is used as the template image.

To prepare the character recognition area, the acquisition device 11 acquires an image signal from the processing device 21 to the display device 23 when it is necessary to recognize characters. The arithmetic device 12 causes the display device 16 to display a screen based on the image signal. The user uses the input device 15 to confirm the area on the displayed screen in which the character recognition is to be performed. The user writes the area to the second file. Or, the user may select two diagonal points of an area in which character recognition is to be performed. The arithmetic device 12 transforms the coordinates of the two selected diagonal points into coordinates of the screen of the display device 23. The arithmetic device 12 writes the transformed coordinates in the second file.

To prepare for color recognition, the acquisition device 11 acquires an image signal from the processing device 21 to the display device 23 when it is necessary to recognize colors. The arithmetic device 12 causes the display device 16 to display a screen based on the image signal. The user uses the input device 15 to select an area on the displayed screen in which color recognition is to be performed. The image of the selected area is stored in the storage device 14. The user writes the area in the second file. Or, the user may select two diagonal points of an area in which color recognition is to be performed. The arithmetic device 12 transforms the coordinates of the two selected diagonal points into coordinates of the screen of the display device 23. The arithmetic device 12 writes the transformed coordinates in the second file.

In the image recognition that uses a template image, the arithmetic device 12 compares the template image and the screen based on the image signal and determines whether or not an image similar to the template image is included in the screen. In character recognition, the arithmetic device 12 cuts out an image of a prestored area. The arithmetic device 12 performs character recognition processing such as optical character recognition (OCR), etc., on the image. In color recognition, the arithmetic device 12 cuts out an image of a prestored area. The arithmetic device 12 determines whether or not the colors of each portion match between a prestored image and the cut-out image. By using such processing to recognize the images, the arithmetic device 12 determines whether or not the operation of the processing device 21 according to the operation signal is completed.

Figure 7A:
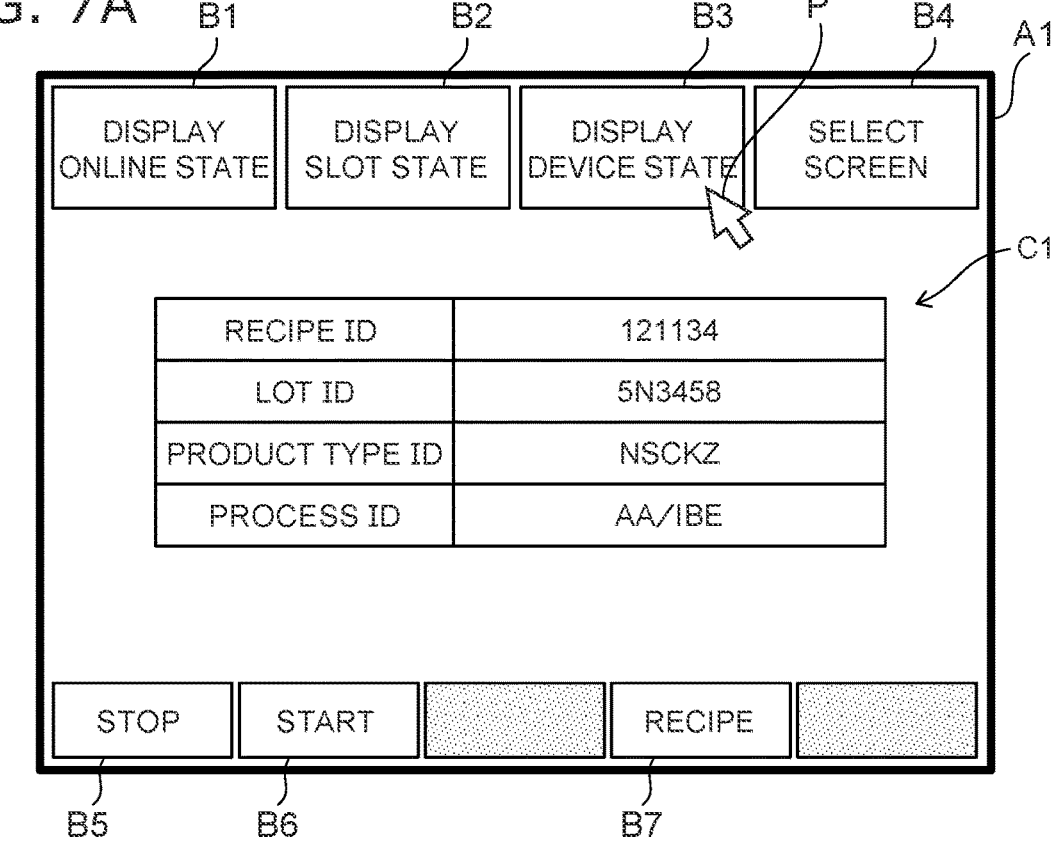
FIGS. 7A and 7B are schematic views illustrating screens of the display device.
Figure 7B:
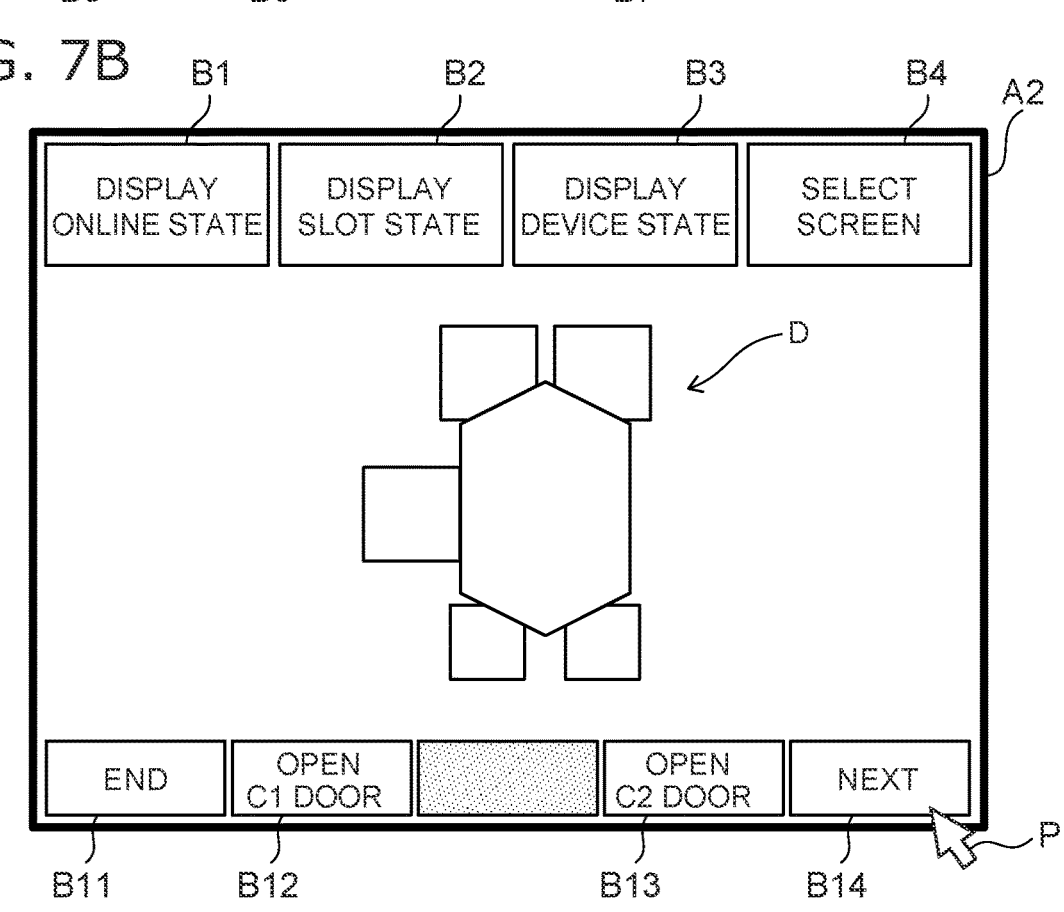

FIGS. 7A and 7B are schematic views illustrating screens of the display device. FIG. 8A is a schematic view illustrating a portion of the first file. FIG. 8B is a schematic view illustrating a portion of the second file.

The generation of an action file by the operating system 10a will now be described with reference to a specific example. In a portion of the processing process by the processing device 21, the screens shown in FIGS. 7A and 7B are displayed by the display device 16 based on image signals output from the processing device 21. The screen A1 shown in FIG. 7A displays the icons B1 to B7 and the information C1. A screen A2 shown in FIG. 7B displays the icons B1 to B4, icons B11 to B14, and a schematic view D of the processing device 21.

In the screen A1 shown in FIG. 7A, the user moves the pointer P to the icon B3 and selects the icon B3. The arithmetic device 12 transforms the selected coordinates into coordinates of the screen of the display device 23. The arithmetic device 12 writes, in the first file, the action of moving the pointer to the transformed coordinates and the action of selecting the coordinates. The arithmetic device 12 writes the transformed coordinates in the second file.

The display device 16 displays the screen A2 shown in FIG. 7B. The template image for determining the transition from the screen A1 to the screen A2 is cut out from the screen A2 by the user. For example, one of the schematic view D or the icons B11 to B14 is used as the template image. The user stores the cut-out template image in the storage device 14 as image data. The user writes, in the second file, the filename of the template image referred to when determining the transition from the screen A1 to the screen A2.

The user moves the pointer P to the icon B14 in the screen A2 and selects the icon B14. The arithmetic device 12 transforms the selected coordinates into coordinates of the screen of the display device 23. The arithmetic device 12 writes, in the first file, the action of moving the pointer to the transformed coordinates and the action of selecting the coordinates. The arithmetic device 12 writes the transformed coordinates in the second file. Thereafter, the storing of the template image and the writing of the filename in the second file are similarly repeated.

For example, as shown in FIGS. 8A and 8B, the first file and the second file are prepared for the operation by the operating system 10*a*. Operations performed by the arithmetic device 12 such as references to the template images, the generation of operation commands to select specific icons, etc., described above are written in the first file. The selected coordinates, filenames of the referenced template images, etc., are written in the second file.

The trigger to start the operation by the operating system 10*a* is arbitrary. For example, the operation may be started based on a signal input to the processing device 21, a signal transmitted from another sensor or measuring instrument, etc. The operation may be started according to a signal transmitted from the other operating system 10*a* or a signal transmitted from another processing device 21 operated by the other operating system 10*a*. The signal may be transmitted during an operation by the other operating system 10*a* or may be transmitted at a time outside the operation by the other operating system 10*a*. The operation may be started when a specific screen is displayed by the display device 23. The operation may be started when the user inputs a specific command to the arithmetic device 12.

Figure 9:
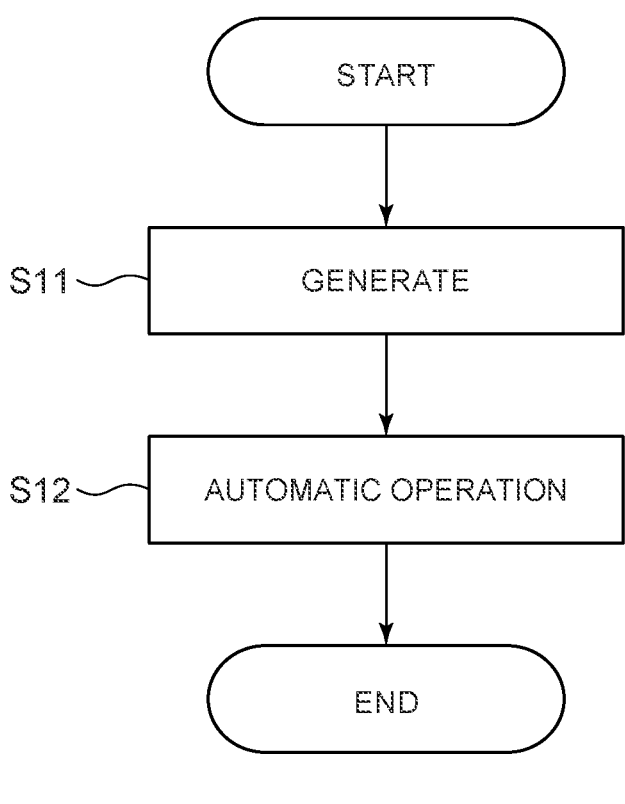
FIG. 9 is a flowchart showing a procedure of the automatic operating method using the operating system according to the first modification of the embodiment.

FIG. 9 is a flowchart showing a procedure of the automatic operating method using the operating system according to the first modification of the embodiment.

The operating system 10*a* performs the operations of the flowchart shown in FIG. 5 so that the user can operate the processing device 21 using the input device 15. The user operates the processing device 21 so that the processing desired to be automatically performed by the processing device 21 is performed. The first file, the reference data, and the second file are generated in the operation (step S11). For example, the arithmetic device 12 writes, in the first file, the action sequence corresponding to the operation by the user. The arithmetic device 12 writes the selected coordinates in the second file. The user stores the reference data in the storage device 14. The user writes the filename of the reference data, etc., in the second file.

The operating system 10*a* uses the first file, the reference data, and the second file that are generated to perform the automatic operation mode of the processing device 21 (step S12). According to the operating system 10*a* according to the first modification, the processing device 21 can be automatically operated by the automatic operation mode. For example, the operation of the processing device 21 can be automated without altering the processing device 21, rewriting programs, etc.

In the operating system 10*a*, the action file is referred to when operating the processing device 21. The action file includes the first and second files. Generation actions for generating operation commands are written in the first file. The second file is generated separately from the first file and is referred to when performing the generation action based on the description in the first file.

There are cases where multiple processing devices 21 of the same type are used in a manufacturing site. The multiple processing devices 21 can be automatically operated respectively by the multiple operating systems 10*a*. In such a case, a common action file and common reference data may be used. For example, after preparing the action file and the reference data for operating one processing device 21, the action file and the reference data are duplicated and used for the operations of the operating systems 10*a*.

Or, even for the same type of processing device 21, there are cases where the displayed screens are slightly different between the processing devices 21. For example, there are cases where the position of the same icon in the same screen is slightly different between the processing devices 21. As a result, there are cases where the desired icon cannot be selected when the coordinates described in the second file are selected by the pointing device. Even for the same type of processing device 21, there are also cases where the appearance of the template image is different between the processing devices 21 due to the effects of noise, degradation over time of the output part of the image signal of the processing device 21, etc. As a result, there are cases where the accuracy of the image recognition decreases.

If such equipment differences exist in a conventional operating system, it is necessary to generate new program files in which the equipment differences are corrected. In other words, it has been necessary to re-generate the program file for generating the operation command even though the basic operation performed by the arithmetic device 12, the reference data that is used, the characters that are input, etc., are substantially the same between the processing devices 21.

In the operating system 10*a*, the information that is used when generating the operation command is written in the second file that is different from the first file. For example, when there is a misalignment of the coordinates of an icon, it is sufficient to modify the description of the coordinates to correct the misalignment. When the appearances of a template image are different, it is sufficient to prepare a template image that has a different appearance and to modify the description in the second file to refer to the image data. According to the embodiment, the equipment difference can be easily corrected, and the burden on the user necessary for preparing the operating system 10*a* can be reduced.

The second file is, for example, a text file. Therefore, even a user without programming-related knowledge can easily correct the second file by writing in the second file in a text format.

The reference data may be generated automatically by the operating system 10*a*. For example, when any of the coordinates are selected, the arithmetic device 12 stores the screen before the selection and the screen after the selection. The arithmetic device 12 detects a change of a feature of the screen after the selection with respect to the feature of the screen before the selection. The arithmetic device 12 extracts a region from the screen after the selection in which the feature change is large. The arithmetic device 12 stores the extracted region in the storage device 14 as a template image. The arithmetic device 12 writes the filename of the template image in the second file. The automatic generation of the reference data can reduce the burden on the user preparing the reference data.

Before operating a manufacturing line, the user may perform a trial of the automatic operation mode to check whether or not a discrepancy exists in the operation performed by the operating system 10*a*. For example, in the trial of the automatic operation mode, the user confirms whether or not the icons are appropriately selected, the images are correctly recognized, etc. When a discrepancy of the automatic operation mode is confirmed, the user corrects the description in the second file as appropriate.

The arithmetic device 12 may automatically correct the coordinates described in the second file. For example, in the trial of the automatic operation mode, the arithmetic device 12 generates a selection operation command to select the coordinates described in the second file and transmits the selection operation command to the generation device 13. Based on the selection operation command, the generation device 13 generates an operation signal and transmits the operation signal to the processing device 21. The arithmetic device 12 recognizes the image acquired by the acquisition device 11 after the operation signal is transmitted, and determines whether or not the template image prepared beforehand is displayed. When the template image is not displayed, the arithmetic device 12 generates another selection operation command to select other coordinates different from the coordinates described in the second file. For example, the other coordinates are randomly determined in the vicinity of the coordinates described in the second file. The arithmetic device 12 transmits the other selection operation command to the generation device 13. Based on the other selection operation command, the generation device 13 generates another operation signal and transmits the other operation signal to the processing device 21. For example, the generation of the other selection operation command is repeated until the template image prepared beforehand is displayed or the number of times that the selection operation command is generated reaches a specified value. The arithmetic device 12 generates another selection operation command to select other coordinates that are different from the coordinates up to that point.

Figure 10:
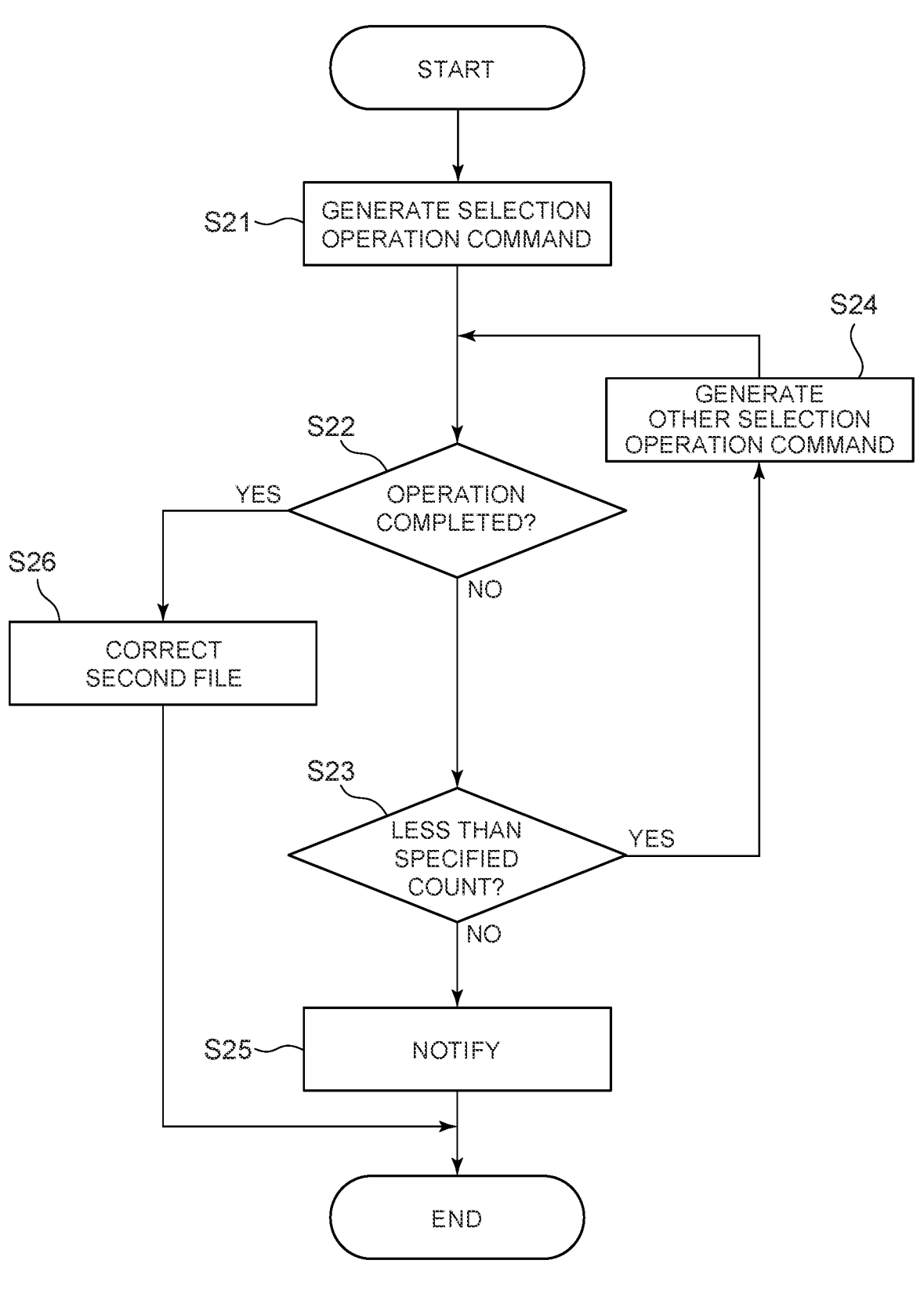
FIG. 10 is a flowchart showing a portion of the trial of the automatic operation mode performed by the operating system according to the embodiment.

FIG. 10 is a flowchart showing a portion of the trial of the automatic operation mode performed by the operating system according to the embodiment.

For example, in the flowchart shown in FIG. 9, a trial of the automatic operation mode using the first file, the second file, and the reference data is performed between steps S1 and S2. In the portion of the trial, the arithmetic device 12 generates a selection operation command to select a portion of the screen (step S21). Based on the selection operation command, the generation device 13 generates an operation signal and transmits the operation signal to the processing device 21. Based on the recognition result of the screen, the arithmetic device 12 determines whether or not the operation of the processing device 21 according to the operation signal is completed (step S22).

When the operation is not completed, the arithmetic device 12 determines whether or not the trial iteration of the selection operation is less than a specified count (step S23). When the trial iteration is less than the specified count, the arithmetic device 12 generates another selection operation command for selecting other coordinates (step S24). Based on this selection operation command, the generation device 13 generates an operation signal and transmits the operation signal to the processing device 21. When the trial iteration of the selection operation has reached the specified count, the arithmetic device 12 notifies the user (step S25). For example, the display device 16 is caused to display information that notifies that the operation cannot be appropriately performed.

When the operation corresponding to the selection operation command is determined to have completed in step S22, the arithmetic device 12 corrects the coordinates described in the second file to the coordinates used in the selection operation command for which the selection operation could be performed (step S26). The second file is not corrected when the selection operation could be performed using the original coordinates written in the second file.

According to the processing of the flowchart shown in FIG. 10, the coordinates described in the second file are automatically corrected when it is necessary to correct the coordinates. The convenience of the operating system 10*a* can be improved thereby.

There are cases where the response of the processing device 21 when the operation signal is input to the processing device 21 is delayed. When determining whether or not the operation corresponding to the selection operation command is completed, there is a possibility that the screen may not have changed due to a delay; and the screen may correctly change after the determination. Therefore, the transmission interval of the operation signal to a processing device 21 that may have a delay of the screen display of the display device 23 is set to be longer, or the operation signal based on the selection operation command is transmitted multiple times. For example, in the flowchart shown in FIG. 10, when the operation is not completed after inputting one operation signal to the processing device 21, the same operation signal may be re-input to the processing device 21 from the generation device 13.

Second Modification

Figure 11:
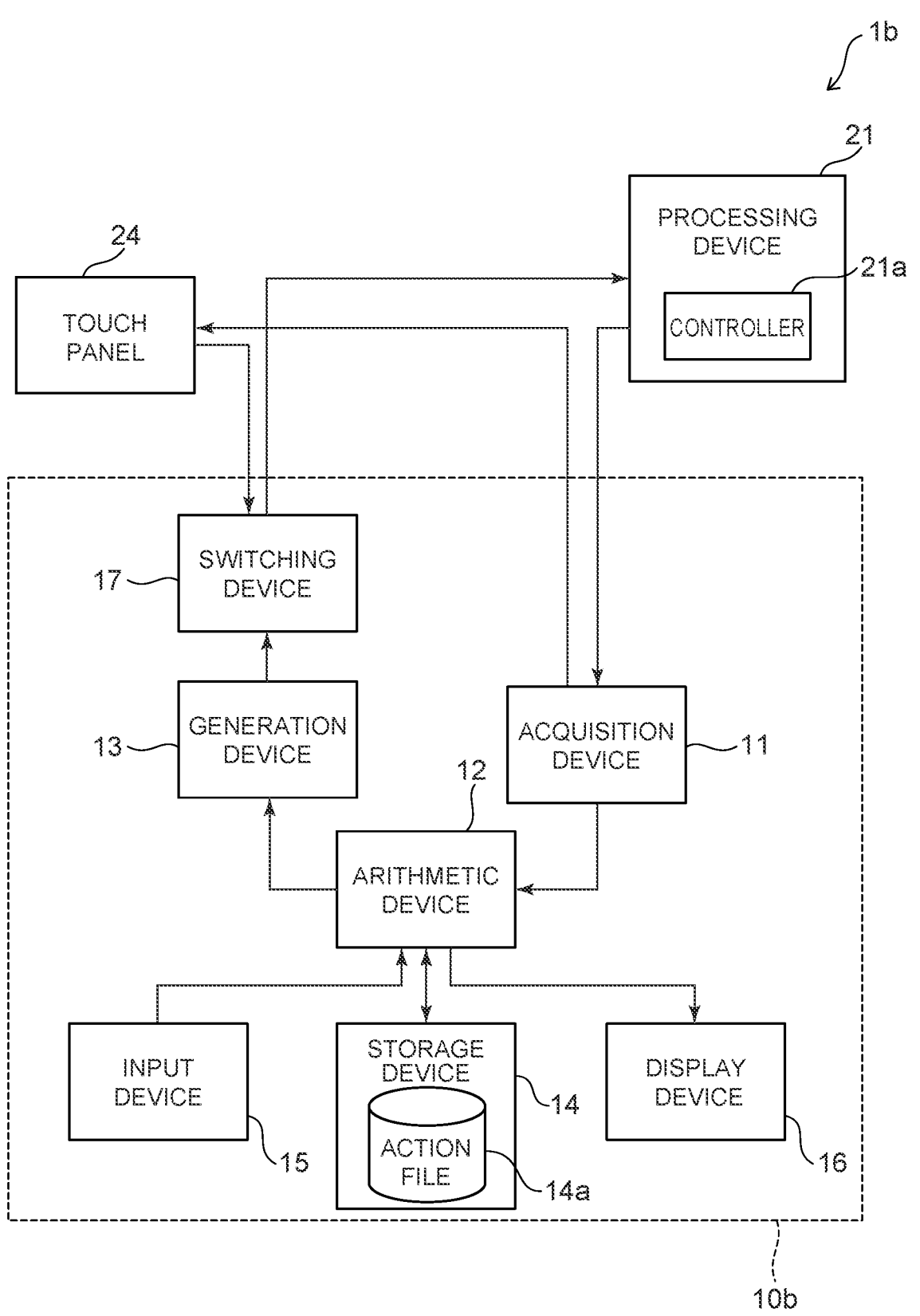
FIG. 11 is a schematic view showing an operating system according to a second modification of the embodiment.

FIG. 11 is a schematic view showing an operating system according to a second modification of the embodiment.

An input-display device that functions as an input device and a display device may be connected to the processing device 21. For example, as shown in FIG. 11, a touch panel 24 is provided as the input-display device. The operating system 10*b* according to the second modification further includes a switching device 17. A processing system 1*b* includes the operating system 10*b* and the processing device 21.

The generation device 13 generates an operation signal corresponding to a signal transmitted from the touch panel 24. The switching device 17 switches the signal input to the processing device 21. Specifically, the signal transmitted from the touch panel 24 and the operation signal transmitted from the generation device 13 are input to the switching device 17. The switching device 17 switches between a state in which the signal transmitted from the touch panel 24 is input to the processing device 21 and a state in which the operation signal transmitted from the generation device 13 is input to the processing device 21. In the operation by the operating system 10*b*, the switching device 17 inputs the operation signal to the processing device 21.

The switching device 17 can prevent the user from operating the processing device 21 with the touch panel 24 during the operation by the operating system 10*b*. For example, the likelihood of an interruption of the automatic operation mode of the operating system 10*b* due to an operation by the user transitioning to another screen can be reduced.

The switching device 17 includes, for example, a relay circuit or a switching circuit. By providing the switching device 17, the processing device 21 in which the touch panel 24 is used can be operated by the operating system 10*b*.

The coordinate misalignment of the generated operation signal of the touch panel 24 is large even for the same type of device. This is because the positional relationship between the display and the coordinates of the sensor detecting the touch are individually adjusted. Accordingly, even when a plurality of the same type of processing device 21 and a plurality of the same type of touch panel 24 are used, there are cases where the coordinates to be selected or referred to in the automatic operation must be corrected for each processing device 21.

In such a case, the equipment difference related to the coordinate misalignment can be easily corrected by correcting the coordinates written in the second file. Therefore, the invention according to the embodiment is especially favorable for the processing device 21 in which the touch panel 24 is used. According to the second modification, the burden on the user preparing the automatic operation mode of the processing device 21 to which the touch panel 24 is connected can be reduced.

Third Modification

Figure 12:
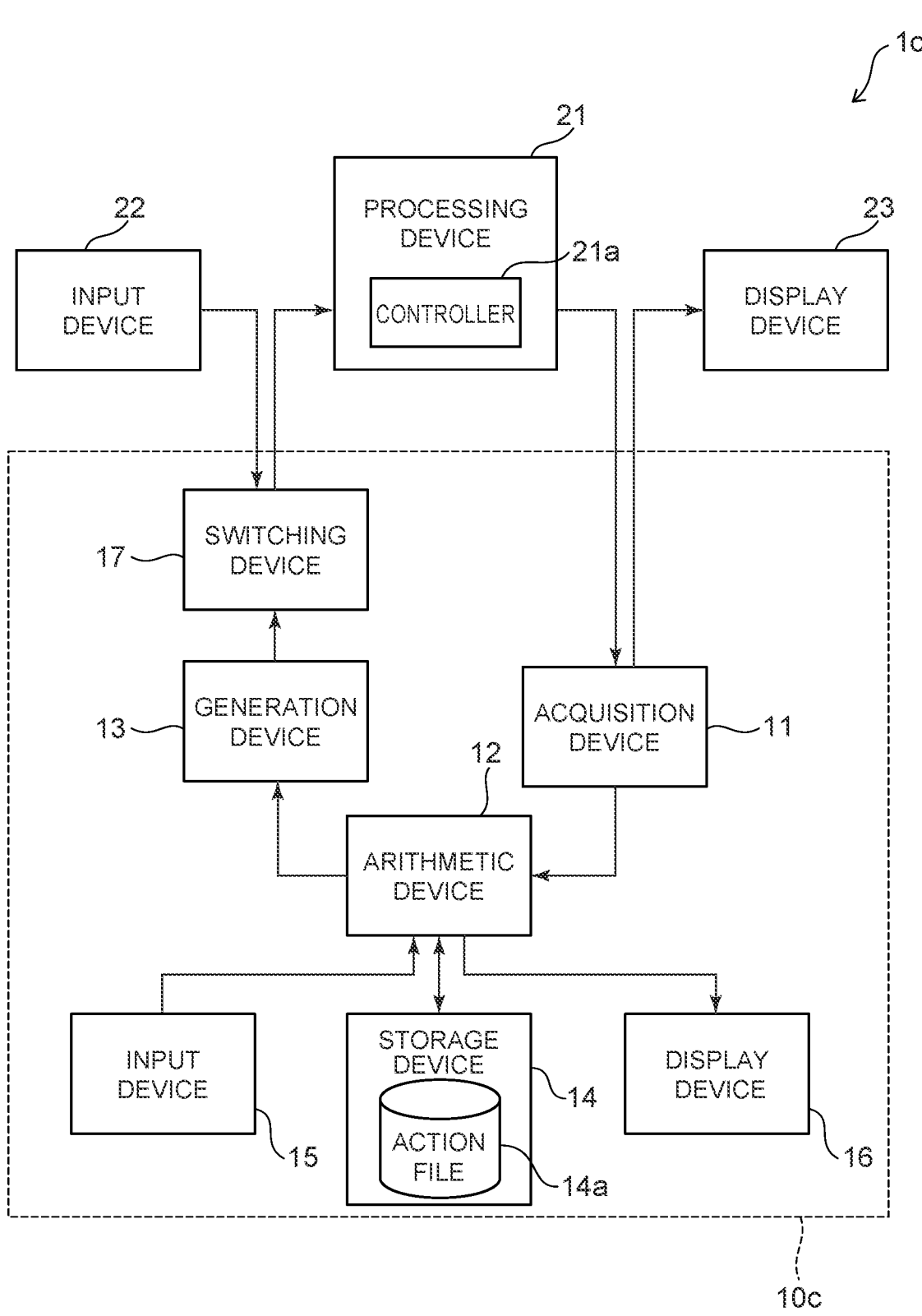
FIG. 12 is a schematic view showing an operating system according to a third modification of the embodiment.

FIG. 12 is a schematic view showing an operating system according to a third modification of the embodiment.

Compared with the operating system 10, the operating system 10c according to the third modification further includes the switching device 17. The signal that is transmitted from the generation device 13 or the input device 22 toward the processing device 21 is input to the processing device 21 via the switching device 17. The switching device 17 switches between a state in which the signal transmitted from the input device 22 is input to the processing device 21 and a state in which the operation signal transmitted from the generation device 13 is input to the processing device 21.

The switching device 17 inputs the operation signal to the processing device 21 during the operation by the operating system 10c. As a result, the user can be prevented from operating the processing device 21 by using the input device 22 during the operation by the operating system 10c. For example, the likelihood of the automatic operation mode being interrupted by an operation by the user can be reduced. According to the third modification, the convenience of a processing system 1c including the operating system 10c and the processing device 21 can be improved.

Fourth Modification

Figure 13:
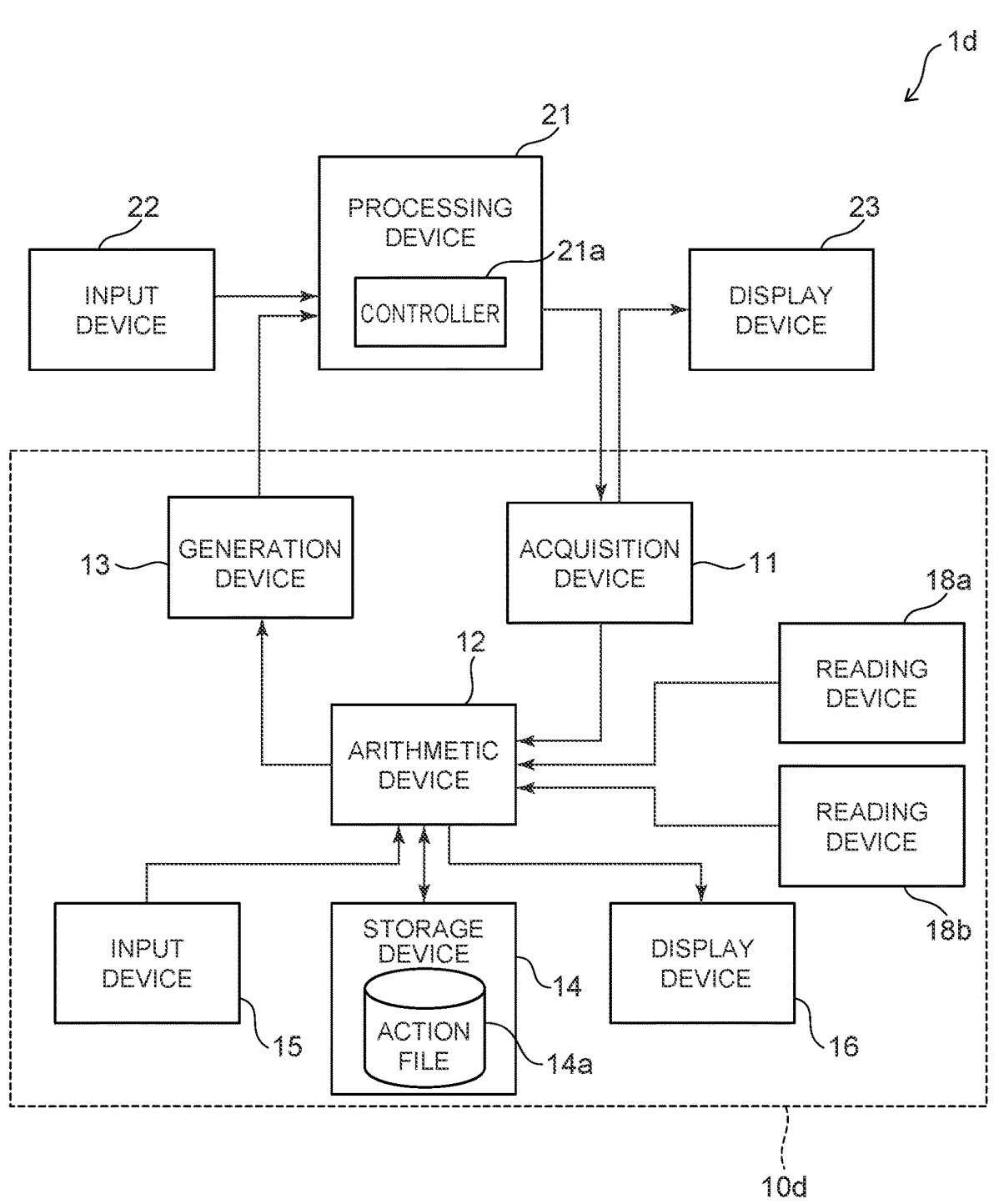
FIG. 13 is a schematic view showing an operating system according to a fourth modification of the embodiment.

FIG. 13 is a schematic view showing an operating system according to a fourth modification of the embodiment.

As shown in FIG. 13, compared to the operating system 10, the operating system 10d according to the fourth modification further includes reading devices 18a and 18b. The reading devices 18a and 18b read identification information. A one-dimensional barcode, a two-dimensional barcode, or a radio frequency identifier (RFID) can be used as the identification information. The reading devices 18a and 18b are barcode readers or RFID readers. For example, the reading device 18a reads the identification information of the operator supervising the processing device 21. The reading device 18b reads the identification information of the workpiece processed by the processing device 21.

For example, when performing the processing by the processing device 21, the user (the operator) places the workpiece at a location at which the reading device 18b can read the identification information of the workpiece. Subsequently, the user reads the user's own identification information into the reading device 18a. The arithmetic device 12 starts the operation of the processing device 21 in response to the reading of the identification information by the reading device 18a. For example, the arithmetic device 12 causes the reading device 18b to read the identification information of the workpiece and then starts the generation of the operation command.

The operating system 10d may generate an operation signal corresponding to the identification information that is read and may input the operation signal to the processing device 21. Or, the identification information may be directly input from the arithmetic device 12 to the processing device 21 by serial communication via a communication port, etc.

As in the fourth modification, the operating system 10d may include another device related to the processing performed by the processing device 21. The operation of the processing device 21 may be started according to an operation of the other device. As a result, it is unnecessary for the user to operate the input device 15 or 22 to start the operation. According to the fourth modification, the convenience of the operating system 10d can be improved. The convenience of a processing system 1d including the operating system 10d and the processing device 21 can be improved.

Fifth Modification

Figure 14:
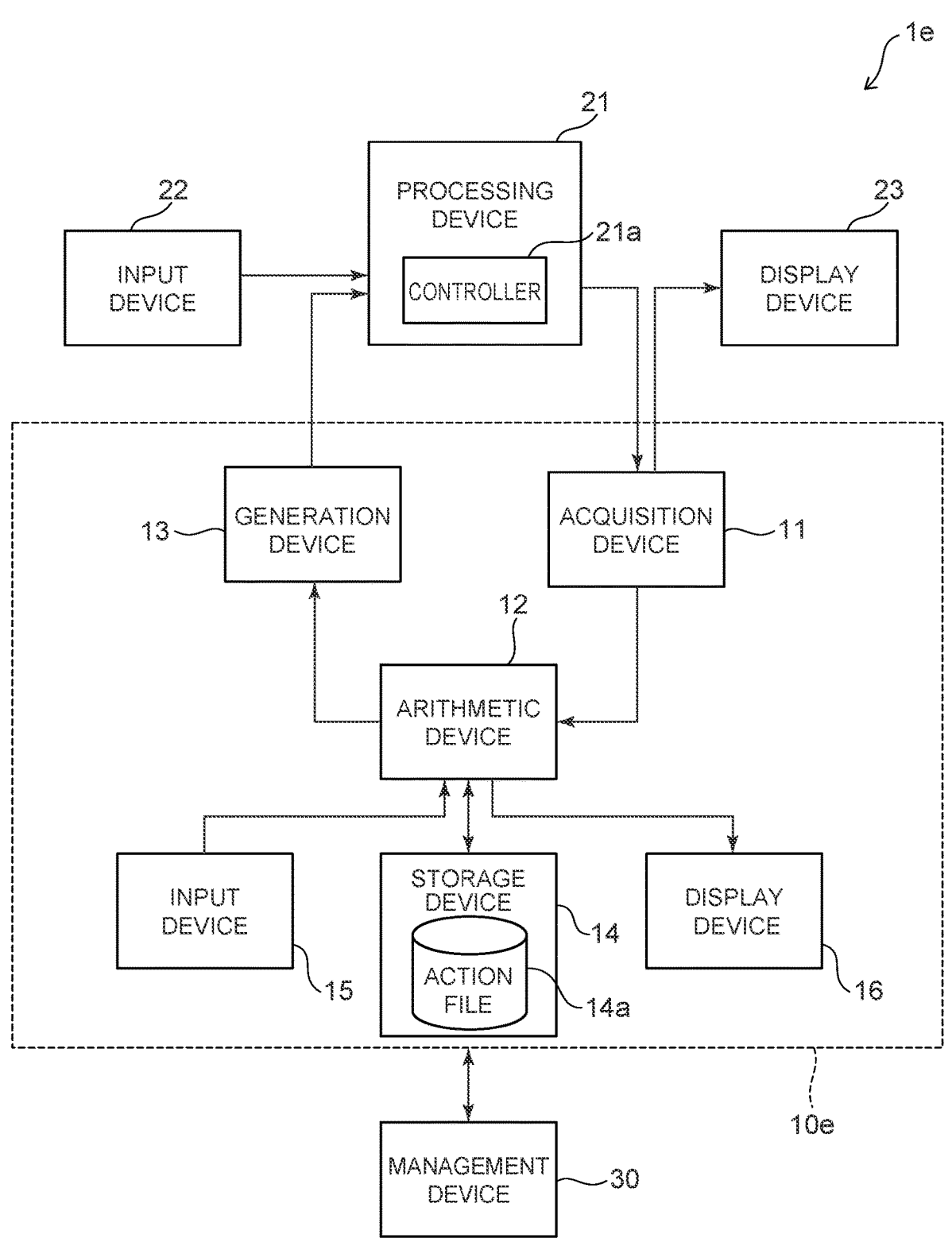
FIG. 14 is a schematic view showing an operating system according to a fifth modification of the embodiment.

FIG. 14 is a schematic view showing an operating system according to a fifth modification of the embodiment.

As shown in FIG. 14, the operating system 10e according to the fifth modification is connected with a management device 30 (a second device). A processing system 1e includes the operating system 10e, the processing device 21, and the management device 30. For example, the arithmetic device 12 is connected with the management device 30 by a network, wired communication, or wireless communication. The management device 30 is a higher-level device transmitting commands toward the processing device 21.

When the management device 30 transmits a command toward the processing device 21, the operating system 10e receives the command. The operating system 10e performs an operation according to the command. For example, the arithmetic device 12 generates an operation command corresponding to the command and transmits the operation command to the generation device 13.

For example, multiple action files are stored in the storage device 14. The arithmetic device 12 selects one of the multiple action files according to the command transmitted from the management device 30. The arithmetic device 12 generates an operation command by executing a program included in the selected action file. Or, the command that is transmitted from the management device 30 may be used as a trigger of the operation start.

Parameters related to the processing performed by the processing device 21 may be input to the processing device 21 by the operating system 10e. The parameters are the number of workpieces to be processed, conditions when processing, etc. The conditions are, for example, the temperature, pressure, flow rate of a gas or liquid, current, voltage, processing time, etc. The operating system 10e generates an operation signal for inputting the numerical values of the parameters and transmits the operation signal to the processing device 21. As a result, the numerical values are input to text boxes displayed by the display device 23, etc.

The parameters that are input from the operating system 10e to the processing device 21 by the management device 30 may be transmitted to the operating system 10e by the management device 30. The command that is transmitted from the management device 30 toward the processing device 21 includes the parameters. The operating system 10e receives the numerical values input as the parameters and generates an operation signal corresponding to the numerical values. As a result, the numerical values that are transmitted from the management device 30 are input to the processing device 21.

Information related to the workpiece to be processed may be transmitted to the operating system 10e by the management device 30. The command that is transmitted from the management device 30 toward the processing device 21 includes information related to the workpiece to be processed. For example, the management device 30 transmits identification information (ID) of the workpiece to the operating system 10e. The operating system 10e inputs the identification information to the processing device 21 via a communication port. Or, the operating system 10e may generate an operation signal corresponding to the identification information and input the operation signal to the processing device 21.

In a manufacturing site, there are cases where a higher-level device is provided to manage multiple processing devices. On the other hand, there are cases where direct commands cannot be transmitted from the management device 30 to the processing device 21 due to communication IF compatibility, communication standard differences, etc., between the processing device 21 and the management device 30. For example, there are cases where an old processing device 21 cannot receive the commands transmitted from the management device 30. In such a case, the processing device 21 can be managed by the management device 30 by using the operating system 10e. For example, it is unnecessary to alter the processing device 21, etc., and the production efficiency can be more easily increased. By using the operating system 10e, the availability of single or multiple processing devices 21 can be transmitted to the management device 30. Therefore, the management device 30 can easily acquire information related to single or multiple operation ratios or availabilities of the processing system 1e.

Sixth Modification

Figure 15:
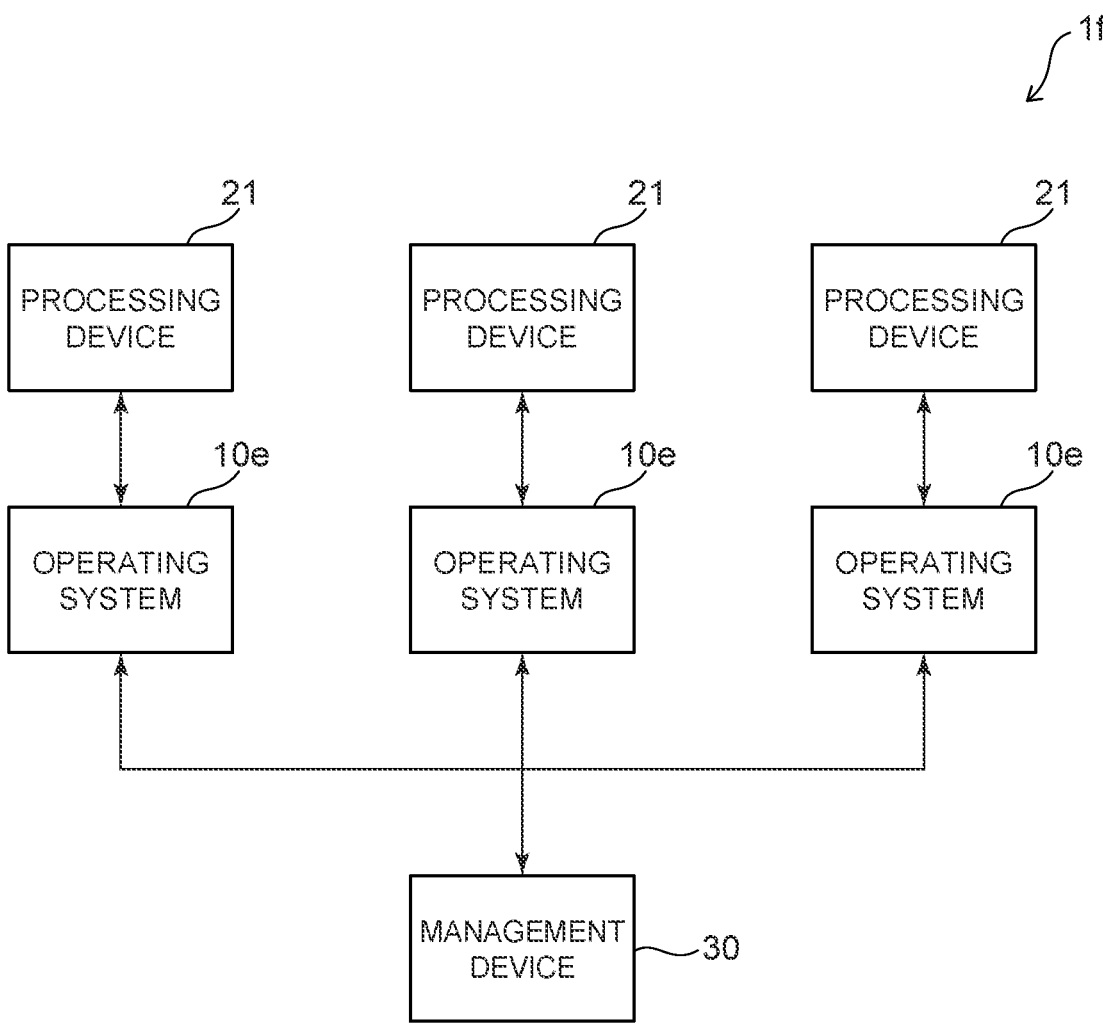
FIG. 15 is a schematic view showing a processing system according to a sixth modification of the embodiment.

FIG. 15 is a schematic view showing a processing system according to a sixth modification of the embodiment.

In the processing system if according to the sixth modification, the management device 30 is connected with multiple operating systems 10e. The multiple operating systems 10e are connected respectively to multiple processing devices 21. The management device 30 transmits commands toward the multiple processing devices 21. The multiple operating systems 10e respectively operate the multiple processing devices 21 according to the commands transmitted from the management device 30. The management device 30 may select one or more of the multiple processing devices 21 and transmit a command toward the selected processing device 21.

According to the processing system if, the management device 30 can acquire information related to the operation ratios or availability of the multiple processing devices 21; and the production efficiency of the multiple processing devices 21 can be increased.

The operation of the processing device 21 by one of the operating systems 10e may be started according to a signal transmitted from another operating system 10e or a signal transmitted from another processing device 21 operated by another operating system 10e. The signal may be transmitted during the operation by the other operating system 10e, or may be transmitted outside the operation by the other operating system 10e. For example, the multiple processing devices 21 can be efficiently operated by transmitting and receiving signals for starting the operations between three or more of the multiple operating systems 10e, the multiple processing devices 21, and the management device 30.

Seventh Modification

Figure 16:
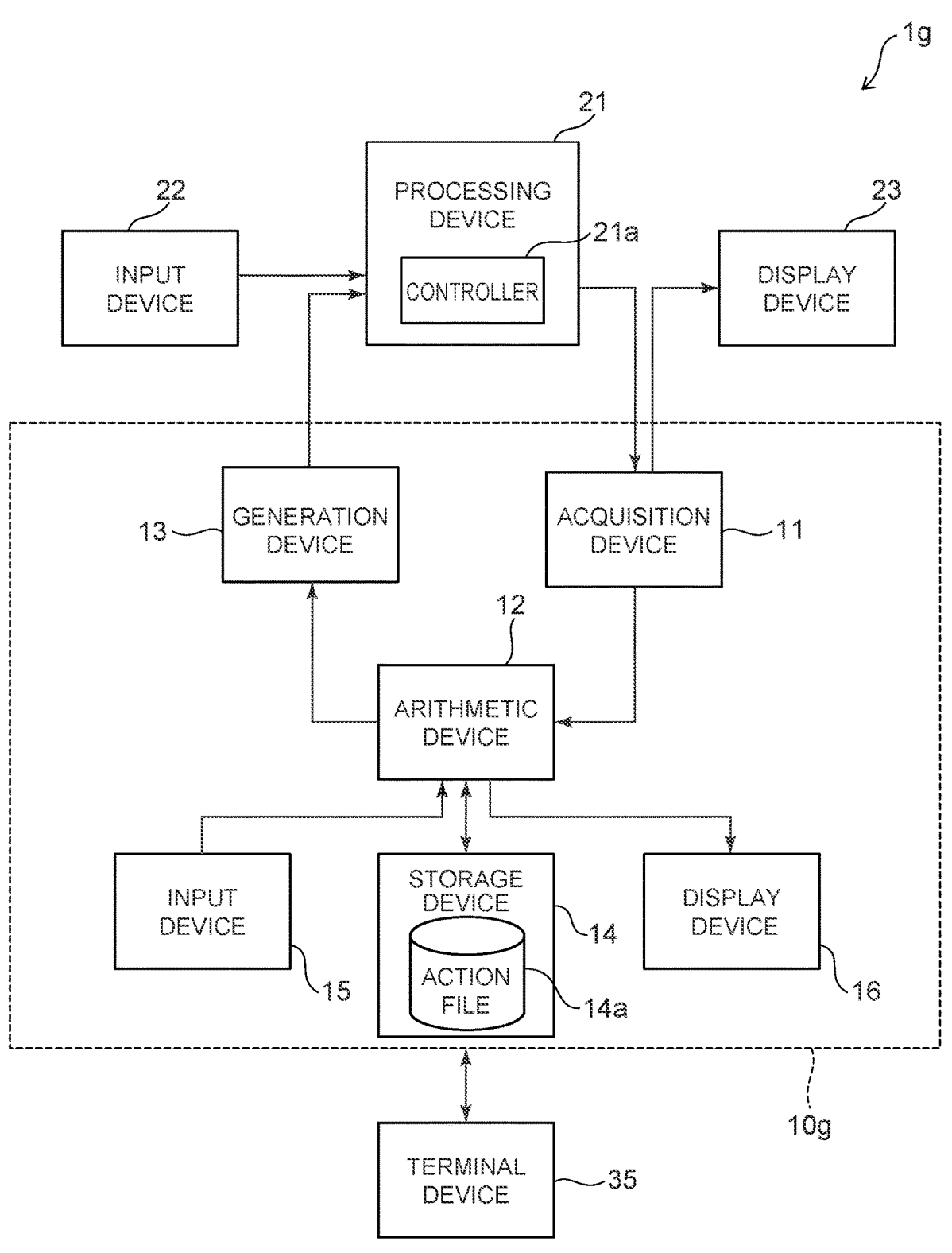
FIG. 16 is a schematic view showing an operating system according to a seventh modification of the embodiment.

FIG. 16 is a schematic view showing an operating system according to a seventh modification of the embodiment.

In the processing system 1g according to the seventh modification, an operating system 10g is connected with a terminal device 35. The operating system 10g is set to be remotely operatable by the terminal device 35. The terminal device 35 can remotely operate the arithmetic device 12 of the operating system 10g.

The user can transmit an input operation to the arithmetic device 12 by operating the terminal device 35. The operating system 10 operates the processing device 21 according to the input operation transmitted from the terminal device 35. The user can operate the terminal device 35 to prepare an action file and implement the automatic operation mode of the operating system 10g, etc.

Even when the operating system 10g is located adjacent to the processing device 21, the operating system 10g can be operated by the terminal device 35 from a location separated from the operating system 10g. According to the seventh modification, the convenience of the processing system 1g can be improved.

Eighth Modification

Figure 17:
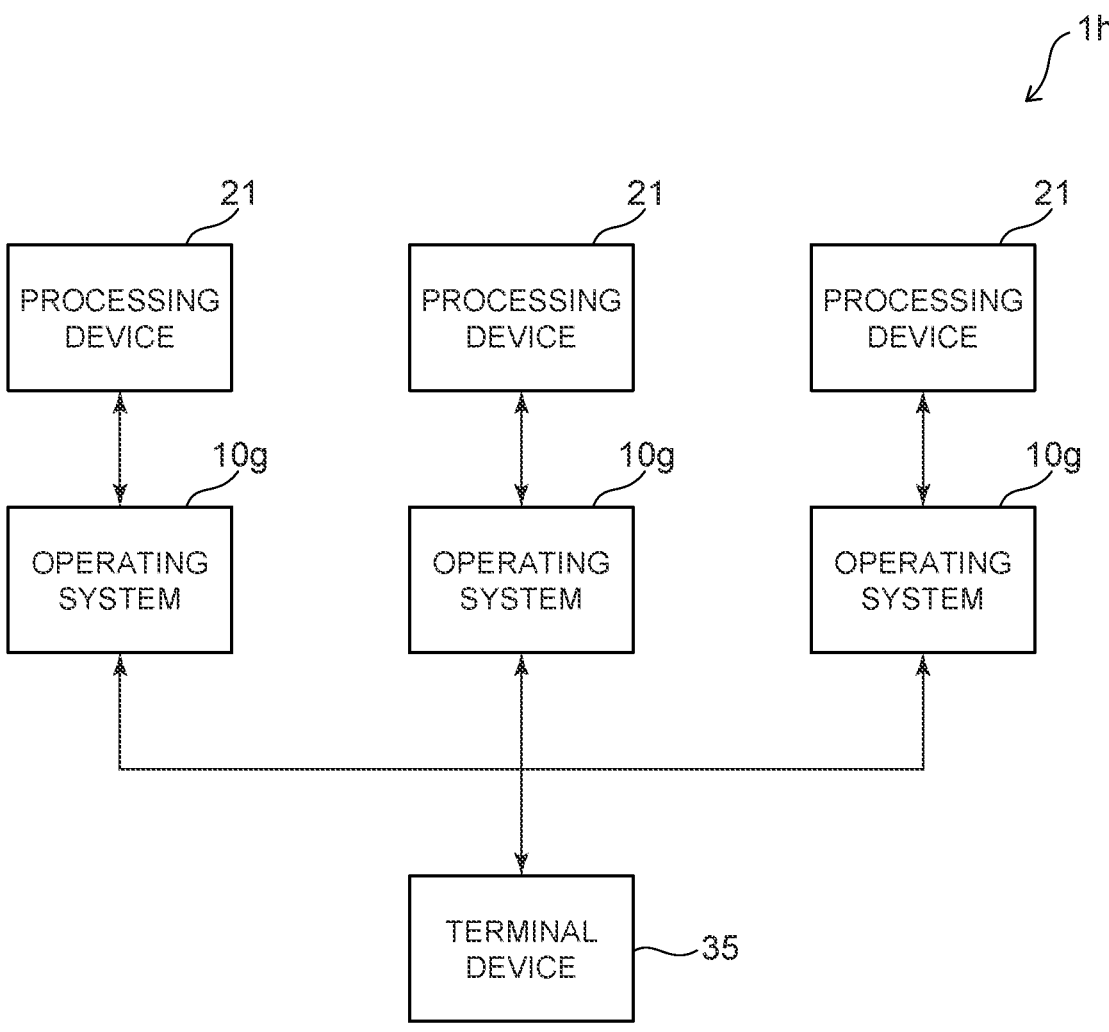
FIG. 17 is a schematic view showing operating systems according to an eighth modification of the embodiment.

FIG. 17 is a schematic view showing operating systems according to an eighth modification of the embodiment.

In a processing system 1h according to the eighth modification, multiple operating systems 10g are connected with the terminal device 35. The terminal device 35 is configured to remotely operate the arithmetic devices 12 of the multiple operating systems 10g.

According to the eighth modification, the multiple operating systems 10g can be operated by one terminal device 35. The setting of the automatic operation modes for operating the multiple processing devices 21, etc., can be performed at a position separated from the multiple operating systems 10g. According to the eighth modification, the convenience of the processing system 1h can be improved.

Figure 18:
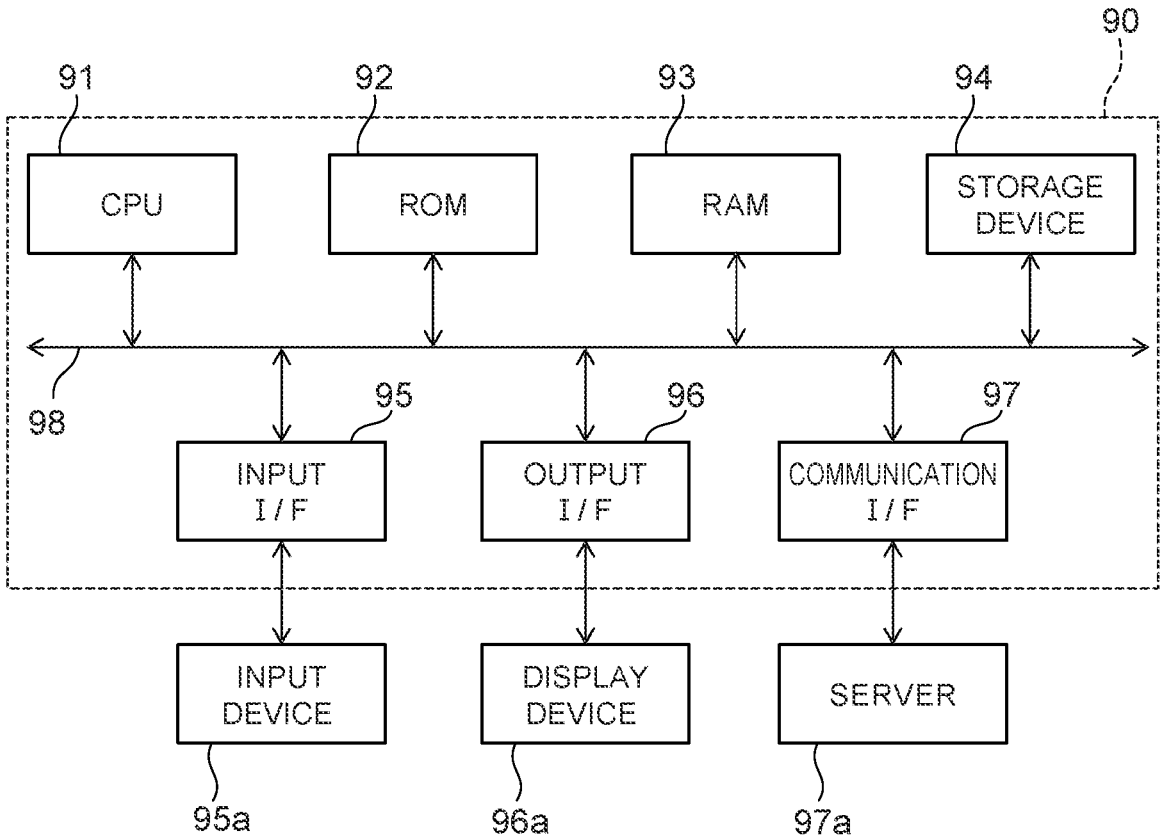
FIG. 18 is a schematic view showing a hardware configuration.

FIG. 18 is a schematic view showing a hardware configuration.

The arithmetic device 12, the controller 21a, the management device 30, and the terminal device 35 each include, for example, the configuration of a computer 90 shown in FIG. 18. The computer 90 includes a CPU 91, ROM 92, RAM 93, a storage device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the storage device 94. When executing the programs, the CPU 91 executes various processing by controlling configurations via a system bus 98.

The storage device 94 stores data necessary for executing the programs and/or data obtained by executing the programs. The storage device 94 may be used as the storage device 14.

The input interface (I/F) 95 connects the computer 90 and an input device 95a. The input I/F 95 is, for example, a serial bus interface such as USB, etc. The CPU 91 can read various data from the input device 95a via the input I/F 95. The input device 95a is used as the input device 15 or 22.

The output interface (I/F) 96 connects the computer 90 and a display device 96a. The output I/F 96 is, for example, an image output interface such as Digital Visual Interface (DVI), High-Definition Multimedia Interface (HDMI (registered trademark)), etc. The CPU 91 can transmit data to the display device 96a via the output I/F 96 and can cause the display device 96a to display a screen. The display device 96a is used as the display device 16 or 23.

The communication interface (I/F) 97 connects the computer 90 and a server 97a outside the computer 90. The communication I/F 97 is, for example, a network card such as a LAN card, etc. The CPU 91 can read various data from the server 97a via the communication I/F 97.

Two or more computers 90 may collaborate to function as the arithmetic device 12, the controller 21*a*, the management device 30, or the terminal device 35. The generation device 13 may be embedded in a computer functioning as the arithmetic device 12; and the computer may function as the arithmetic device 12 and the generation device 13. A program that functions as the arithmetic device 12 and a program that functions as the generation device 13 may be implemented by one computer.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the operating system, the processing system, or the operating method described above, the processing device 21 can be easily remotely operated, and the convenience of the processing device 21 can be improved. Similar effects can be obtained by using a program to cause the computer to perform the operating method. According to a method for constructing a processing system in which an operating system is constructed and connected with a first device, a processing system can be provided in which the processing device 21 can be easily operated.

The embodiments may include the following characteristics.

(Characteristic 1)

An operating system, the operating system acquiring an image signal from a first device, the first device being an operation object, causing a display device to display a screen based on the image signal, generating an operation command corresponding to an input operation from a user in response to the input operation, generating an operation signal compatible with the first device based on the operation command, and transmitting the operation signal to the first device.

(Characteristic 2)

The operating system according to Characteristic 1, wherein the screen is caused to be displayed based on the image signal by enlarging or reducing according to a resolution of the display device.

(Characteristic 3)

The operating system according to Characteristic 2, wherein the input operation includes a selection in the screen, and the operation command includes a transformation of a coordinate selected in the screen into a coordinate of a screen of a display device connected to the first device.

(Characteristic 4)

The operating system according to any one of Characteristics 1 to 3, wherein the input operation is written in an action file, and the action file includes operation content for the first device.

(Characteristic 5)

The operating system according to Characteristic 4, wherein the operating system is configured to perform an automatic operation mode of generating the operation command based on the action file.

(Characteristic 6)

The operating system according to Characteristic 5, wherein in the automatic operation mode, the operating system determines, based on a recognition result of the screen, whether or not an operation on the first device according to the operation signal is completed.

(Characteristic 7)

The operating system according to Characteristic 5, wherein the operating system generates a template image based on a change of a feature of the screen, and in the automatic operation mode, the operating system determines, based on a comparison result between the screen and the template image, whether or not an operation on the first device according to the operation signal is completed.

(Characteristic 8)

The operating system according to any one of Characteristics 5 to 7, wherein the operating system:

receives a command transmitted from a second device toward the first device; and performs the automatic operation mode according to the command.

(Characteristic 9)

The operating system according to Characteristic 8, wherein the operating system generates the operation command corresponding to the command in the automatic operation mode according to the command.

(Characteristic 10)

The operating system according to Characteristic 8 or 9, wherein the operating system selects one action file from a plurality of the action files in the automatic operation mode according to the command, and the operating system generates the operation command based on the selected action file.

(Characteristic 11)

The operating system according to any one of Characteristics 8 to 10, wherein the command includes information related to:

a parameter input to the first device; or a workpiece processed by the first device.

(Characteristic 12)

The operating system according to any one of Characteristics 5 to 11, wherein the automatic operation mode is performed according to identification information read by a reading device.

(Characteristic 13)

A processing system, comprising:

the operating system according to any one of Characteristics 1 to 12; and the first device performing processing of a workpiece.

(Characteristic 14)

The processing system according to Characteristic 13, comprising:

a plurality of the first devices;

a plurality of the operating systems respectively transmitting the operation signals to the plurality of first devices; and a terminal device transmitting the input operations to the plurality of operating systems.

(Characteristic 15)

A method for constructing a processing system, the method comprising:

constructing the operating system; and setting the operating system to be remotely operatable from a terminal device, the operating system being connected with a first device, the operating system acquiring an image signal from the first device, causing a screen to be displayed based on the image signal, generating an operation command corresponding to an input operation from a user in response to the input operation, generating an operation signal compatible with the first device based on the operation command, and transmitting the operation signal to the first device.

(Characteristic 16)

A computer, the computer generating an operation command corresponding to an input operation from a user in response to the input operation, generating an operation signal compatible with a first device based on the operation command, the first device being an operation object, and transmitting the operation signal to the first device.

(Characteristic 17)

The computer according to Characteristic 16, wherein the computer writes the input operation to an action file including operation content for the first device.

(Characteristic 18)

The computer according to Characteristic 17, wherein the computer is configured to perform an automatic operation mode of generating the operation command based on the action file.

(Characteristic 19)

An operating method, comprising:

acquiring an image signal from a first device, the first device being an operation object;

causing a display device to display a screen based on the image signal;

generating an operation command corresponding to an input operation from a user in response to the input operation;

generating an operation signal compatible with the first device based on the operation command, and transmitting the operation signal to the first device.

(Characteristic 20)

The operating method according to Characteristic 19, wherein the input operation includes a selection in the screen, the screen is caused to be displayed based on the image signal by enlarging or reducing according to a resolution of the display device, and the operation command includes a transformation of a coordinate selected in the screen into a coordinate of a screen of a display device connected to the first device.

(Characteristic 21)

The operating method according to Characteristic 19 or 20, further comprising:

determining that an operation is performed by the screen; and writing the operation to an action file including operation content for the first device.

(Characteristic 22)

The operating method according to Characteristic 21, wherein the operation command is generated based on the action file.

(Characteristic 23)

A program causing a computer to execute the operating method according to any one of Characteristics 19 to 22.

(Characteristic 24)

A non-transitory computer-readable storage medium storing a program, the program causing a computer to execute the operating method according to any one of Characteristics 19 to 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An operating system, comprising:

an acquisition device including a capture unit and a divider, the acquisition device being configured to acquire an image signal from a first device, the first device being an operation object;

an arithmetic device including first processing circuitry, the first processing circuitry being configured to cause a first display device to display a first screen based on the image signal, generate an operation command corresponding to an input operation from a user in response to the input operation, the input operation including a selection in the first screen, the operation command including a transformation of a position selected in the first screen into a position of a second screen of a second display device connected to the first device, the input operation being written in an action file, the action file including operation content for the first device; and a generation device including second processing circuitry, the second processing circuitry being configured to generate an operation signal compatible with the first device based on the operation command, and transmit the operation signal to the first device, wherein the action file includes a first file and a second file, a generation action for generating the operation command being written in the first file, at least the transformed position in the second screen is written in the second file, and the second file is referred to when performing the generation action.

2. The operating system according to claim 1, wherein the first screen is caused to be displayed based on the image signal by enlarging or reducing according to a resolution of the first display device.

3. The operating system according to claim 2, wherein the operation command includes a transformation of a coordinate selected in the first screen into a coordinate of the second screen of the second display device.

4. The operating system according to claim 1, wherein the operating system is configured to perform an automatic operation mode of generating the operation command based on the action file.

5. The operating system according to claim 4, wherein in the automatic operation mode, the operating system determines, based on a recognition result of the first screen, whether or not an operation on the first device according to the operation signal is completed.

6. The operating system according to claim 4, wherein the operating system generates a template image based on a change of a feature of the first screen, and in the automatic operation mode, the operating system determines, based on a comparison result between the first screen and the template image, whether or not an operation on the first device according to the operation signal is completed.

7. The operating system according to claim 4, wherein the operating system:
   receives a command transmitted from the second display device toward the first device; and
   performs the automatic operation mode according to the command.

8. The operating system according to claim 7, wherein the operating system generates the operation command corresponding to the command in the automatic operation mode according to the command.

9. The operating system according to claim 7, wherein the command includes information related to:
   a parameter input to the first device; or
   a workpiece processed by the first device.

10. The operating system according to claim 4, wherein the automatic operation mode is performed according to identification information read by a reading device.

11. A processing system, comprising:
the operating system according to claim 1; and
the first device performing processing of a workpiece.

12. The processing system according to claim 11, comprising:
   a plurality of first devices;
   a plurality of operating systems respectively transmitting the operation signals to the plurality of first devices; and
   a terminal device transmitting input operations to the plurality of operating systems.

13. A computer comprising:
processing circuitry configured to
   acquire an image signal from a first device, the first device being an operation object;
   cause a first display device to display a first screen based on the image signal,
   generate an operation command corresponding to an input operation from a user in response to the input operation, the input operation including a selection in the first screen, the operation command including a transformation of a position selected in the first screen into a position of a second screen of a second display device connected to the first device, the input operation being written in an action file, the action file including operation content for the first device;
   generate an operation signal compatible with the first device based on the operation command, and
   transmit the operation signal to the first device,
wherein the action file includes a first file and a second file,
a generation action for generating the operation command being written in the first file,
at least the transformed position in the second screen is written in the second file, and
the second file is referred to when performing the generation action.

14. The computer according to claim 13, wherein the computer is configured to perform an automatic operation mode of generating the operation command based on the action file.

15. An operating method, comprising:
acquiring an image signal from a first device, the first device being an operation object;
causing a first display device to display a first screen based on the image signal,
generating an operation command corresponding to an input operation from a user in response to the input operation, the input operation including a selection in the first screen, the operation command including a transformation of a position selected in the first screen into a position of a second screen of a second display device connected to the first device, the input operation being written in an action file, the action file including operation content for the first device; and
generating an operation signal compatible with the first device based on the operation command, and
transmitting the operation signal to the first device,
wherein the action file includes a first file and a second file,
a generation action for generating the operation command being written in the first file,
at least the transformed position in the second screen is written in the second file, and
   the second file is referred to when performing the generation action.

16. The operating method according to claim 15, wherein the input operation includes a selection in the first screen, the first screen is caused to be displayed based on the image signal by enlarging or reducing according to a resolution of the first display device, and
the operation command includes a transformation of a coordinate selected in the first screen into a coordinate of the second screen of the second display device.

17. A non-transitory computer-readable storage medium storing a program,
the program causing a computer to execute the operating method according to claim 15.

* * * * *